US010521462B2

(12) United States Patent
Acampado

(10) Patent No.: US 10,521,462 B2
(45) Date of Patent: Dec. 31, 2019

(54) VIRTUAL SERVICES RAPID DEPLOYMENT TOOL

(71) Applicant: Accenture Global Solutions Limited, Dublin (IE)

(72) Inventor: Carl Thomas Marquises Acampado, Rizal (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/907,111

(22) Filed: Feb. 27, 2018

(65) Prior Publication Data

US 2019/0266280 A1    Aug. 29, 2019

(51) Int. Cl.
*G06F 9/455*    (2018.01)
*G06F 16/332*    (2019.01)
(Continued)

(52) U.S. Cl.
CPC .......... *G06F 16/3329* (2019.01); *G06F 9/455* (2013.01); *G06F 17/20* (2013.01); *H04L 67/10* (2013.01)

(58) Field of Classification Search
CPC .......... G06F 3/04847; G06F 8/70; G06F 8/77; G06F 17/277; G06F 17/2881; G06F 17/30507; G06F 17/30654; G06F 17/30675; G06F 17/30867; G06F 3/0481; G06F 3/0484; G06F 9/44; G06F 17/27; G06F 17/28; G06F 17/30; G06F 9/455; G06F 9/54; G06F 16/3329; G06F 17/20; G06F 19/00; G06F 21/62; G16H 80/00;
(Continued)

(56) References Cited

U.S. PATENT DOCUMENTS 7,519,529 B1 *    4/2009    Horvitz ................. G06F 17/279
                                                                    704/7
7,778,948 B2 *    8/2010    Johnson ................... G09B 7/02
                                                                    704/8
(Continued)

OTHER PUBLICATIONS

Mustafa, A., et al., "Artificial Intelligence (ChatBoT's)," Feb. 2017, pp. 1-3, International Journal of Scientific & Engineering Research, vol. 8, Issue 2, ISSN 2229-5518.

(Continued)

*Primary Examiner* — Gerald Gauthier
(74) *Attorney, Agent, or Firm* — Brinks Gilson & Lione

(57) ABSTRACT

A system for rapid deployment and configuration of a virtual agent to a hosted cloud platform is provided. A virtual agent builder may convert a dialog corpus into a dialog model that includes parameters that cause a cognitive service engine to provide natural language processing for the virtual agent according to the dialog corpus. Depending on the natural language processing capabilities of the cognitive engine service, the dialog model may be included in the virtual agent or communicated to the cognitive service engine. The virtual agent, or individual components of the virtual agent, may be generated and/or reconfigured in real time using predetermined logic that is selected based on virtual agent configuration parameters. The virtual agent configuration parameters may be received from a graphical user interface that reduces the complexity of deploying and/or managing the virtual agent.

17 Claims, 10 Drawing Sheets

(51) Int. Cl.
*H04L 29/08* (2006.01)
*G06F 17/20* (2006.01)

(58) Field of Classification Search
CPC .......... G06N 3/006; G06N 5/043; G06N 3/00; G06N 3/04; G06N 5/02; G06N 5/04; G06N 99/00; G06Q 10/06316; G06Q 10/06318; G06Q 30/0643; G06Q 10/06; G06Q 30/00; G06Q 30/02; H04L 41/147; H04L 67/10; H04L 12/24; H04L 12/58; H04L 29/08; G10L 13/04; G10L 15/01; G10L 15/22; G06T 13/40
USPC .......... 704/9, 275, 7, 257, 8; 705/2, 5, 26.1; 707/769; 709/206, 223; 714/38.14; 717/124, 100; 726/19; 379/32.01; 702/184; 706/45, 11, 55; 340/572.1
See application file for complete search history.

(56) References Cited

U.S. PATENT DOCUMENTS

| | | | | |
|---|---|---|---|---|
| 7,818,215 | B2* | 10/2010 | King | H04N 1/00244 705/26.1 |
| 7,853,551 | B1* | 12/2010 | Gill | G06Q 10/06 706/55 |
| 8,166,448 | B2* | 4/2012 | Mitra | G06F 8/20 717/100 |
| 8,346,555 | B2* | 1/2013 | Metz | G10L 15/197 704/235 |
| 8,346,563 | B1* | 1/2013 | Hjelm | G10L 15/1822 379/88.01 |
| 8,438,031 | B2* | 5/2013 | Ross | G10L 15/1822 704/251 |
| 9,390,087 | B1* | 7/2016 | Roux | G06F 17/2881 |
| 10,042,636 | B1* | 8/2018 | Srivastava | G06F 8/70 |
| 10,068,284 | B1* | 9/2018 | Zisk | G06Q 30/0601 |
| 2003/0083903 | A1* | 5/2003 | Myers | G06F 19/324 705/2 |
| 2003/0191627 | A1* | 10/2003 | Au | G06F 17/2785 704/9 |
| 2007/0038436 | A1* | 2/2007 | Cristo | G06F 17/273 704/9 |
| 2007/0112574 | A1* | 5/2007 | Greene | G06F 9/5072 340/572.1 |
| 2009/0216691 | A1* | 8/2009 | Borzestowski | G06F 16/3332 706/11 |
| 2010/0064178 | A1* | 3/2010 | Dhulipalla | G06F 11/3688 714/38.14 |
| 2010/0250196 | A1* | 9/2010 | Lawler | G06N 3/006 702/184 |
| 2011/0252108 | A1* | 10/2011 | Morris | H04L 51/32 709/206 |
| 2011/0265175 | A1* | 10/2011 | Bhat | G06F 11/3672 726/19 |
| 2012/0116800 | A1* | 5/2012 | McCallie | G06Q 10/10 705/2 |
| 2012/0321052 | A1* | 12/2012 | Morrill | H04L 29/06027 379/32.01 |
| 2013/0268260 | A1* | 10/2013 | Lundberg | G06F 17/28 704/8 |
| 2013/0275164 | A1* | 10/2013 | Gruber | G10L 17/22 705/5 |
| 2014/0074454 | A1* | 3/2014 | Brown | G10L 15/08 704/9 |
| 2014/0074483 | A1* | 3/2014 | van Os | G10L 15/22 704/275 |
| 2014/0237451 | A1* | 8/2014 | Koneru | G06F 11/3688 717/124 |
| 2014/0365226 | A1* | 12/2014 | Sinha | G10L 25/00 704/275 |
| 2015/0058467 | A1* | 2/2015 | Douglas | G06Q 10/0631 709/223 |
| 2015/0293904 | A1* | 10/2015 | Roberts | G06F 17/30976 704/9 |
| 2015/0302003 | A1* | 10/2015 | Yadgar | G10L 15/19 704/9 |
| 2016/0071517 | A1* | 3/2016 | Beaver | G06F 17/279 |
| 2016/0080165 | A1* | 3/2016 | Ehsani | G10L 21/06 704/9 |
| 2016/0085743 | A1* | 3/2016 | Haley | G06F 17/28 704/9 |
| 2016/0203408 | A1* | 7/2016 | Shita | H04L 67/12 706/11 |
| 2016/0342694 | A1* | 11/2016 | Allen | H04L 67/10 |
| 2017/0161360 | A1* | 6/2017 | Barsukova | G06F 16/3329 |
| 2017/0192778 | A1* | 7/2017 | Srivastava | G06F 8/20 |
| 2017/0300648 | A1* | 10/2017 | Charlap | G16H 50/30 |
| 2017/0344889 | A1* | 11/2017 | Sengupta | G06F 17/2785 |
| 2017/0364805 | A1* | 12/2017 | Boyer | G06F 16/3329 |
| 2017/0364806 | A1* | 12/2017 | Boyer | G06N 5/022 |
| 2018/0025075 | A1* | 1/2018 | Beller | G06F 17/277 707/769 |
| 2018/0053503 | A1* | 2/2018 | Ogunyoku | H04W 4/90 |
| 2018/0062938 | A1* | 3/2018 | Garrison | H04L 41/147 |
| 2018/0113594 | A1* | 4/2018 | Alnatsheh | G06F 3/04815 |
| 2018/0114527 | A1* | 4/2018 | Zilotti | G10L 15/18 |
| 2018/0122363 | A1* | 5/2018 | Braz | G10L 15/01 |
| 2018/0144738 | A1* | 5/2018 | Yasavur | G06F 17/2775 |
| 2018/0174020 | A1* | 6/2018 | Wu | G06N 3/006 |
| 2018/0203852 | A1* | 7/2018 | Goyal | G06F 17/2881 |
| 2018/0218305 | A1* | 8/2018 | Shah | G06Q 10/06316 |
| 2018/0225365 | A1* | 8/2018 | Altaf | G06F 17/30675 |
| 2018/0232632 | A1* | 8/2018 | Kaskari | G06N 3/049 |
| 2018/0255122 | A1* | 9/2018 | Hu | H04L 47/72 |
| 2018/0260760 | A1* | 9/2018 | Srivastava | G06Q 10/063118 |
| 2018/0260856 | A1* | 9/2018 | Balasubramanian | G06F 17/277 |
| 2018/0285595 | A1* | 10/2018 | Jessen | G06F 21/6245 |
| 2018/0300310 | A1* | 10/2018 | Shinn | G06F 17/277 |
| 2018/0329957 | A1* | 11/2018 | Frazzingaro | G06F 17/30507 |
| 2018/0336972 | A1* | 11/2018 | Carbonell | G06F 17/3053 |
| 2018/0341396 | A1* | 11/2018 | Yaseen | G06Q 10/10 |
| 2018/0374000 | A1* | 12/2018 | Herzig | G06N 3/006 |
| 2019/0116136 | A1* | 4/2019 | Baudart | H04L 51/02 |
| 2019/0122409 | A1* | 4/2019 | Meadows | G06T 13/40 |
| 2019/0213057 | A1* | 7/2019 | Nitta | G06F 9/541 |
| 2019/0266280 | A1* | 8/2019 | Acampado | H04L 67/10 |

OTHER PUBLICATIONS

How it works, "Virtual Agent," dated Oct. 13, 2017, pp. 1-5, retrieved from the Internet at URL: https://console.bluemix.net/docs/services/virtual-agent/how-it-works.html#how-it-works.

Patel, N., "How to Train Your Chatbot and Make the Most of It," dated Jan. 10, 2018, pp. 1-10, retrieved from the Internet at URL: https://www.business2community.com/mobile-apps/train-chatbot-make-01981139.

* cited by examiner

VIRTUAL SERVICES RAPID DEPLOYMENT TOOL

TECHNICAL FIELD

This disclosure relates to natural language processing and, in particular, to configuration and deployment of virtual agents in a hosted-cloud platform.

BACKGROUND

Virtual agents, such has a chat bot, may use natural language processing to provide artificially intelligent conversations. A virtual agent is typically designed for use with one communication channel and one provider of the natural language processing to engage in the artificially intelligent conversations with users. Changes to the virtual agents, natural language processing providers, and/or communication channels may require redevelopment and other coordinated efforts. Redevelopment of the virtual agent may be costly, inefficient, and/or prone to errors.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
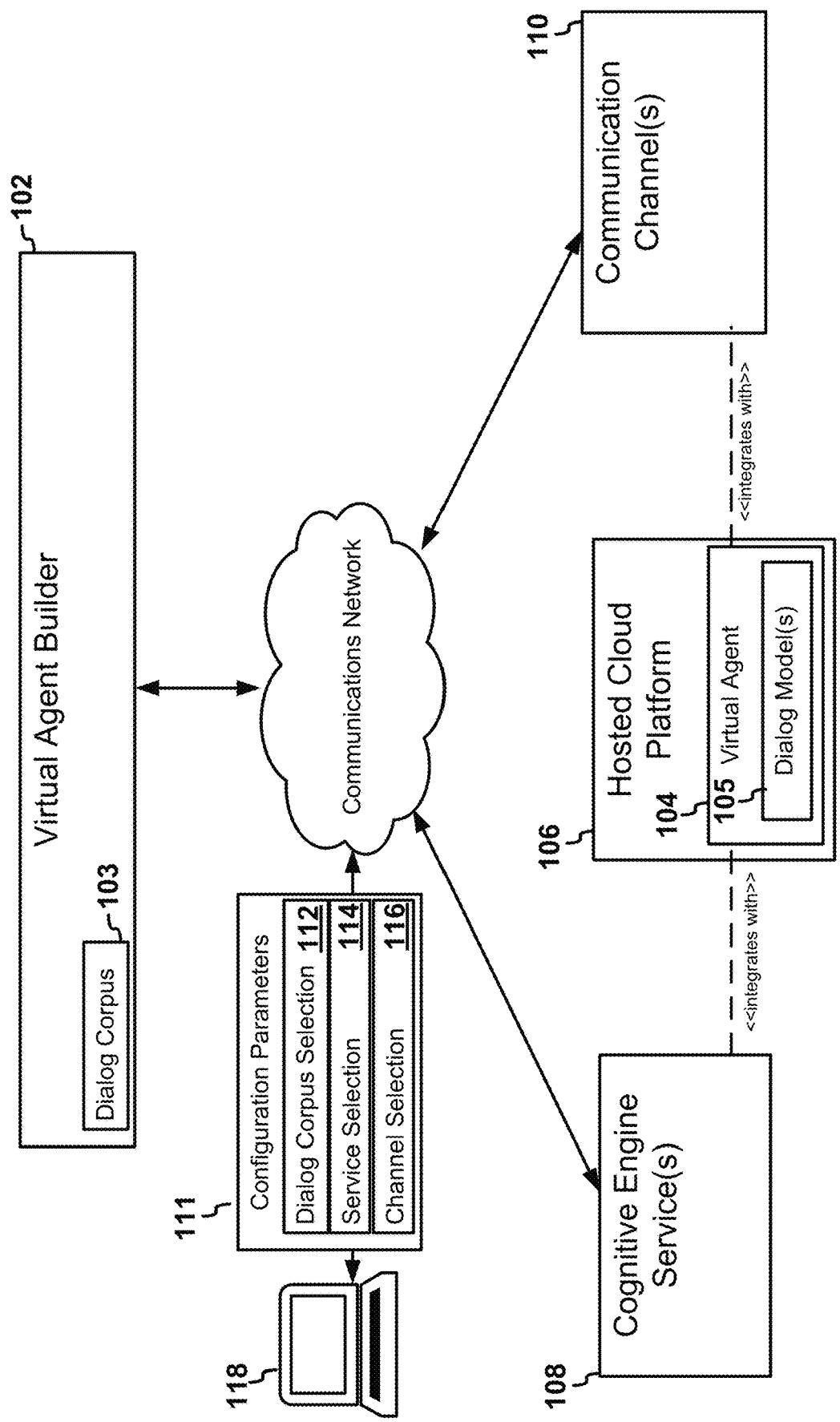
FIG. 1 illustrates an example of a system.

By way of an introductory example, the system may obtain virtual agent configuration parameters. The virtual agent configuration parameters may include a service identifier and a dialog corpus. The dialog corpus may include a plurality of intent parameters and a plurality of intent response parameters. At least one of the intent parameters may be associated with at least one of the intent response parameters. The service identifier may correspond to a selected cognitive service engine.

The system may generate a virtual agent for a hosted-cloud platform. The virtual agent may include instructions to receive natural language input and to respond the natural language input using the selected cognitive service engine.

The system may select, based on the service identifier, a service builder stored in a database. The database may include a plurality of service builders configured to generate respective dialog models. Each of the respective dialog models may be independently configured for a separate selected cognitive service engine.

The system may generate, by execution of service builder logic associated with the selected service builder, a dialog model configured for the selected cognitive service engine. The dialog model may include parameters which cause the selected cognitive service engine to process natural language input according to the intent parameters and the intent response parameters included in the dialog corpus.

Depending on the selected cognitive service engine and the service builder, the system may either configure the selected cognitive service engine with the generated dialog model by communication of the generated dialog model to the cognitive service engine. Alternatively or in addition, the system may generate a dialog service application that uses the generated dialog model to interact with the selected cognitive service engine. The system may deploy the virtual agent to the hosted-cloud platform.

In some examples, the system may generate a diagnostics controller for the virtual agent. The diagnostics controller may test the virtual agent based on a test case. The test case may communicate a test message to the virtual agent based on at least one of the intent parameters of the dialog corpus. The test case may compare an output message of the virtual agent to an expected result based on at least one of the intent response parameters of the dialog corpus.

Alternatively or in addition, the system may access test case logic stored in a logic repository. The test case logic may include an input field and a result field. The system may replace the input field with intent request information corresponding to at least one of the intent parameters of the dialog corpus. The system may replace the result field with intent response information corresponding to at least one of the intent response parameters of the dialog corpus. The system may include the test case logic configured with the intent request information and intent response information in a diagnostics controller of the virtual agent. The diagnostics controller may execute the test case logic to test the virtual agent based on the intent request information and the intent response information.

In some examples, the received virtual agent configuration parameters further include an analytics type identifier. The system may select analytics engine logic stored in a logic repository. The analytics logic may be associated with the analytics type identifier. The system may generate a real-time analytics engine for the virtual agent. The real-time analytics engine may include the selected analytics engine logic. The analytic engine logic may the real-time analytics engine to monitor the one or more variables and communicate a display interface that includes the one or more variables.

In some examples, the system may generate a graphical user interface. The graphical user interface may include a first control, a second control, and/or a third control. The first control may enable selection of one or more cognitive service engines. The second control may allow input of the dialog corpus. The third control may trigger generation, deployment, and/or configuration of the virtual agent.

In some examples, the selected cognitive service engine may provide natural language generation. The system may configure the selected cognitive service engine with the generated dialog model by communication of the generated dialog model to the cognitive service engine.

In some examples, the system may communicate, to the selected cognitive service engine, natural language input received from a terminal device. The system may receive, from the cognitive service engine, an intent classification corresponding to the natural language input. The system may communicate, to the terminal device that sent the natural language input, a response based on the dialog corpus.

One example of a technical advancement achieved by the systems and methods described below may be that customized virtual agents may be rapidly configured and deployed. Users may select predefined features that are used for a "one-click" deployment of one or more virtual agents to a hosted-cloud platform. Human development error may be minimized as logic for the virtual agent may be automatically generated based on predefined deployment configurations. Operation of the virtual agents may be tracked in real time and used to pinpoint the source of the errors, such as the predefined logic used in the virtual agents.

Another example of the technical affect achieved by the system and method describe below may be that dialog models used in natural language processing may be customized for particular natural language processing services. For example, the cognitive service engines may each follow separate processing standards, algorithms, and/or natural language processing approaches. Depending on the implementation of a virtual agent, one cognitive service engine and/or communication channel may be desirable over another. Instead of re-developing the virtual agent from scratch, which is prone to inefficiencies and errors, the virtual agent may be generated or reconfigured in real time with a different cognitive service engine using a predefined dialog corpus and/or predefined, tested logic.

Another example of the technical affect achieved by the system and methods described below may be that test cases for virtual agents may be generated or configured for the virtual agent using a predefined dialog corpus. As the protocols and logic of the cognitive service engines and/or the communication channels change over time, the test cases identify problems. Automated generation and reconfiguration of the test cases based on the dialog corpus may minimize errors and inefficiencies caused by manual test development.

The systems and methods described herein offer improvements over existing market solutions. For example, the system and methods described below may enable rapid prototyping during the conceptualization, proof of concept, and ideation phase with minimal to no code development. Alternatively or in addition, the system and methods described below may enable parallel development with modularized corpus features that may be merged into a single corpus for a particular implementation. For example, dialog corpus patterns may be reused between multiple virtual agents of the same or related nature. Additional benefits, efficiencies, and improvements over existing market solutions are made evident in the systems and methods described below.

FIG. 1 illustrates an example of a system 100. The system 100 may include a virtual agent builder 102 and/or a virtual agent 104 configured on a hosted-cloud platform 106. The virtual agent builder 102 may include a service that is configured to manage the virtual agent 104 or multiple virtual agents. Managing the virtual agent 104 may include generating, provisioning, deploying, deleting, and/or controlling the virtual agent 104. The virtual agent builder 102 may include a platform that lets developers create and manage customizable, easy to integrate, virtual agents with little to no manual software or hardware development. Alternatively or in addition, the virtual agent builder 102 may include a data analytics dashboard, user interface templates, and/or a test suite. Virtual agents created using the virtual agent builder 102 may be integrated with various cognitive service engines 108, communication channels 110, and/or other external and backend systems In some examples, the virtual agent builder 102 may include a dialog corpus 103. The dialog corpus 103 may include a model used to provide intelligent dialog by a machine. The dialog corpus 103 may include intelligent dialog for a particular area of knowledge, such as user support for a product or service. The dialog corpus 103 may include intents and corresponding responses that are used provide automated responses to inputs provided by one or more users. The information in the dialog corpus 103 may follow a format or protocol that is agnostic to a particular provider of natural language services. The format or protocol of the dialog corpus 103 may follow rules understood by the virtual agent builder 102 to build the virtual agent 104 so that the virtual agent 104 communicates with one or more cognitive service engines 108 to provide intelligent dialog based on the dialog corpus 103. For example, the virtual agent builder 102 may convert the dialog corpus 103 into instructions, models, or other information used to communicate with the one or more cognitive service engines 108.

The virtual agent 104 may include an artificial conversation entity, which conducts computer-automated intelligent conversation. The virtual agent 104 may include, for example, a chatbot. The virtual agent 104 may provide intelligent conversation with one or more users. Alternatively or in addition, the virtual agent 104 may lead, initiate, and/or engage in intelligent conversation. For example, the virtual agent 104 may respond to questions and/or statements communicated to the virtual agent 104 by the one or more users. The intelligent conversations may include text communications and/or voice communications. The virtual agent 104 may receive the communications from the communication channels 110. The virtual agent 104 may process the communication using one or more cognitive service engines 108.

In some examples, the virtual agent 104 may include a dialog model 105 or multiple dialog models. The dialog model 105 may include rules and/or parameters that enables intelligent conversation using a particular cognitive service engine or set of cognitive service engines. The dialog model 105 may include parameters which cause the cognitive service engine 108 to process natural language input according to the intent requests and the intent responses included in the dialog corpus 103. In some examples, the parameters include service parameters that are used by the cognitive service engine 108 to provide natural language processing and/or natural language understanding. Alternatively or in addition, the parameters may include logic used by the dialog service application 206 to interacts with one or more cognitive service engines.

The virtual agent 104 may be deployed to and/or configured on the hosted-cloud platform 106. The hosted-cloud platform 106 may include one or more physical and/or logical servers that are built, hosted and/or delivered over a communications network. In some examples, the hosted-cloud platform 106 may include logical servers that are made available through virtualization. Alternatively or in addition, one or more physical servers may host a virtual server. For example, the physical server may include one or more logical servers, each of which has a separate OS, user interface, etc. Alternative or in addition, the hosted-cloud platform 106 may include one or more dedicated physical servers. The hosted-cloud platform 106 may include APIs, command interfaces, and/or other user or machine interfaces to facilitate the deployment, management, and configuration of one or more server, applications, hardware, software, services, and/or any other feature provided by or included in the one or more server.

The virtual agent builder 102 may obtain virtual agent configuration parameters 111. Virtual agent configuration parameters 111 may include any information that is used to manage, configure, generate and/or deploy the virtual agent 104. For example, the virtual agent configuration parameter may include a dialog corpus selection 112, a service selection 114, and/or a communications channel selection 116. The dialog corpus selection 112 may include the dialog corpus 103, an identifier of the dialog corpus 103, or other information related to a selected dialog corpus. For addition discussion related to the dialog corpus 103, refer to FIG. 7. The service selection 114 may correspond to a selected cognitive service engine and include information used to identify and/or communicate with the cognitive service engine 108. The channel selection 116 may correspond to a selected communications channel and include information used to identify and/or use the communications channel 110. In other examples, the virtual agent parameters may include addition and/or fewer parameters.

The virtual agent builder 102 may generate the virtual agent 104 based on the configuration parameters. The virtual agent 104 may include logic configured to receive natural language input and to respond the natural language input using the selected cognitive service engine. The virtual agent 104 may utilize the selected cognitive service engine to identify one or more intents in the natural language input. The selected dialog corpus 103 may proscribe the responses associated with the intents.

In some examples, the virtual agent builder 102 may communicate with a terminal 118 to receive a command, instruction, parameter, and other information used to manage the virtual agent 104. For example, the virtual agent builder 102 may communicate or display one or more interfaces on a terminal that enable a user to manage one or more virtual agent 104. The virtual agent builder 102 may generate and/or configure the virtual agent 104 in one click upon providing configuration parameters such as the dialog corpus selection 112, the service selection 114, the channel selection 116, a virtual agent identifier, a virtual agent description and/or other configuration parameters. Alternatively or in addition, the virtual agent builder 102 may generate and/or configure the virtual agent 104 based on a type of virtual agent selected. For example, a virtual agent type may be associated with a predetermined cognitive service identifier and/or a predetermined dialog corpus.

The system 100 may be implemented in many different was. In some examples, the system may include additional or fewer components. For example, the system may include the virtual agent builder 102 without the virtual agent 104. Alternatively or in addition, the system 100 may include the virtual agent 104 and/or the hosted-cloud platform 106 that hosts the virtual agent 104. In some examples, the system 100 may include one or more cognitive service engine 108 and/or one or more communication channel 110.

The cognitive service engines 108 cognitive may each include a distinct technology platform that provides a unique implementation of cognitive computing. Cognitive computing may refer to any combination of machine learning, human computer interaction, natural language processing, natural language understanding, speech recognition, intent recognition and/or any other features which interpret and/or respond to natural language input, human dialog, and/or human emotion. Various cognitive service engines may be available and each may provide varying degrees of cognitive computing. The cognitive service engines 108 may include, for example, IBM WATSON, AMAZON LEX, MICROSOFT LUIS, and/or other commercially available or custom-made cognitive service engines.

In some examples, the cognitive service engine 108 may provide natural language understanding, natural language generation, or a combination of natural language understanding and natural language generation. In some examples, the cognitive service engine 108 may provide natural language understanding without natural language generation. The cognitive eservice may receive a natural language input and identify intent information from the natural language input. The cognitive service engine 108 may communicate the intent information to the virtual agent 104. In other examples, the cognitive service engine 108 may provide both NLP and NLU. For example, the cognitive service engine 108 may identify intent information from the natural language input and generate a response.

The communication channel 110 may include a protocol, network, or service that facilitates the exchange of digital communications. For example, the communication channel 110 may include a social media network, a chat application, a video call application, and/or any other kind of application or hosted service provider that receives or displays interactive communications. In other examples, the communication channel 110 may include voice over IP (VOIP), SMS, email, or any other kind of type of communication exchange.

The dialog corpus selection 112 may include and/or identify one or more dialog corpus. For example, the service builder may include multiple dialog corpuses that may be referenced based on the dialog corpus selection 112. In other examples, the dialog corpus selection 112 may include all of the parameters included in the dialog corpus. The virtual agent builder 102 may store the received dialog corpus in a database.

The virtual agent builder 102 may generate and/or manage individually customized virtual agents. Each of the virtual agents may use a unique combination of one or more cognitive service engines 108 and/or one or more communication channels 110. Alternatively or in addition, the virtual agent builder 102 may customize virtual agents with unique conversation processing, diagnostics, analytics, and/or user interfaces.

Figure 2:
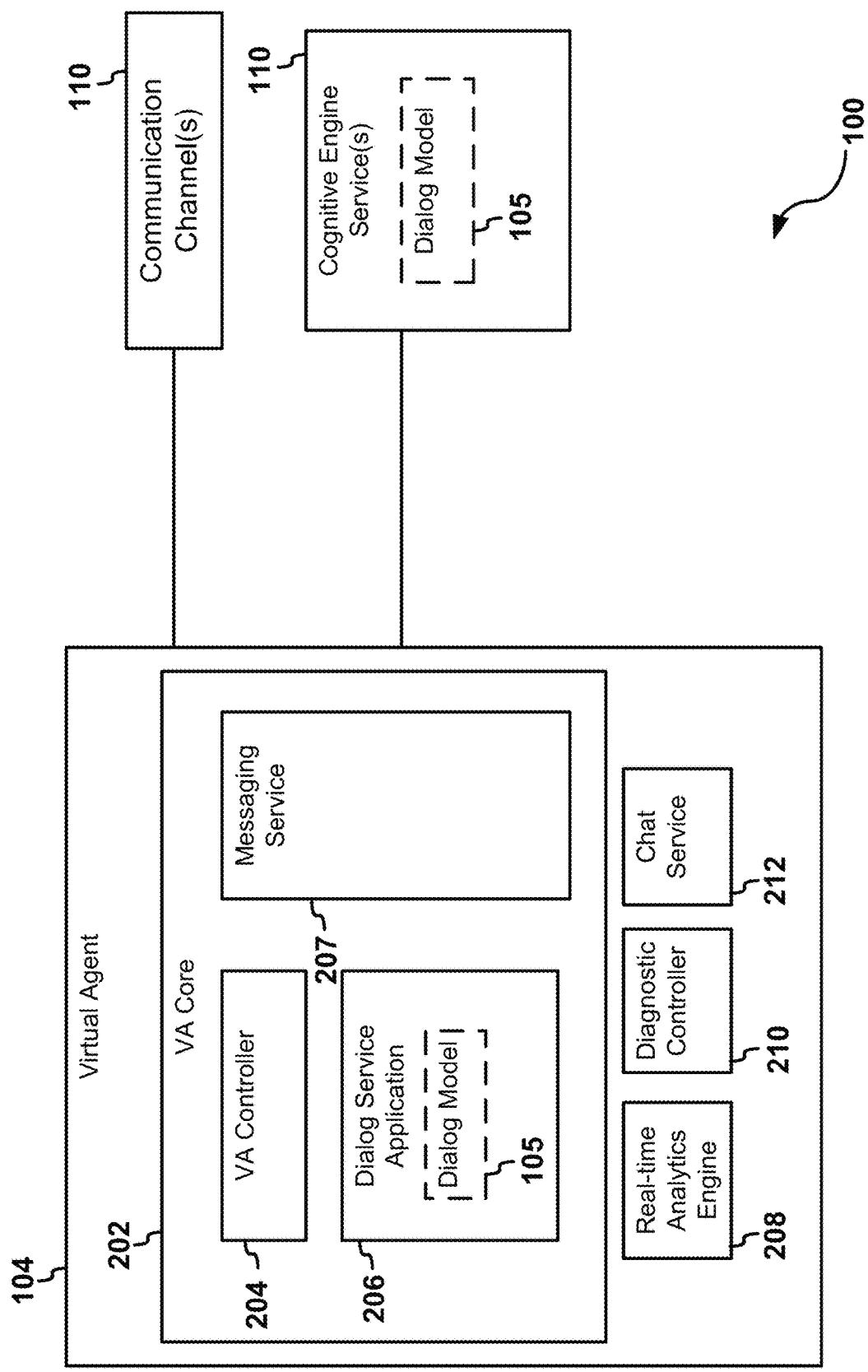
FIG. 2 illustrates an example of a virtual agent.

FIG. 2 illustrates an example of the virtual agent 104. The virtual agent 104 may include a virtual agent core 202. The virtual agent core 202 may include a virtual agent controller (VA controller) 204.

The VA controller 204 may facilitate the management and operation of the virtual agent 104. For example, the VA controller 204 may provide one or more interface for managing the virtual agent 104. Alternatively or in addition, the VA controller 204 may communicate natural language communications with one or more user. In some examples, the virtual agent 104 may facilitate a conversation session with a terminal remote to the virtual agent 104.

The VA core 202 may include a dialog service application 206. In some examples, dialog service application 206 may include a service that communicates with the cognitive service engine 108, or multiple cognitive service engines. In some examples, the virtual agent 104 may include a separate dialog service application for each cognitive service engine that the virtual agent 104 uses.

The dialog service application 206 may receive a natural language input. The natural language input may be created, for example, by a user or a test case. The VA controller 204 may communicate and/or route the natural language input to the dialog service application 206 and/or the cognitive service engine 108. In some examples, multiple cognitive service engines may be available. Each of the available cognitive service engines may communicate using a separate protocol, rules, and/or application programming interfaces (API). In some examples, a particular cognitive service engines may provide an implementation of natural language processing that is best suited for a particular type of virtual agent. The dialog service application 206 may be configured to utilize and/or communicate with the particular cognitive service engine. The virtual agent 104 may include any number of dialog service applications, each configured for a separate cognitive service engine. Alternatively or in addition, the dialog service application 206 may be configured for multiple cognitive service engines.

Depending on the cognitive service engine 108, the dialog service application 206 may be utilize with the dialog model 105, or the cognitive service engine 108 may utilize the dialog model 105. For example, various cognitive service providers may not provide NLG or it may be desirable implement custom NLG. The dialog service application 206, or some other service, may provide the NLG. The dialog model 105 in FIG. 2 is illustrated with a dashed line to signify that the dialog model 105 may be implemented in the cognitive service engine 108, the dialog service application 206, or both. In some examples, the dialog model 105 may be configured with the dialog service application 206 when the cognitive service engine 108 does not provide NLG or when the NLG provided by the dialog service application 206 is not used. Alternatively, the dialog model 105 may be configured with the cognitive service engine 108 when the cognitive service engine 108 provides NLG.

In examples where the dialog service application 206 provides NLG, the dialog model 105 may include logic that enables the dialog service application 206 to respond to NLU results. For example, the cognitive service engine 108 may interpret natural language input and generate the NLU results. The NLU results may include, for example, intent information. The dialog service application 206 may receive the NLU results from the cognitive service engine 108. The dialog model 105 may include instructions that generate a natural langue response to the NLU results. The natural language response may include an intent response. The virtual agent 104 may communicate the natural language response to a remote device and/or a user who originally communicated the natural language input.

The VA core 202 may include a message service 207, or some other messaging system to exchange messages with the cognitive service engines 108, the communication channels 110, the virtual agent builder 102, subcomponents of the virtual agent 201, a terminal, a user, and/or any other system that uses the virtual agent.

The virtual agent 104 may be implemented in many different ways. For example, the virtual agent 104 may include a real-time analytics engine 208, a diagnostics controller 210, and/or a chat service 212. The real-time analytics engine 208 may monitor the operating status of the VA. The real-time analytics engine 208 may monitor runtime information from the VA, including number of conversations sessions, number of resolved issues, number of unresolved issues, number of completed sessions, number of abandoned sessions, and other information related to the operation of the VA. In some examples, the real-time analytics engine 208 may conduct various data processing activities such as extract, transform, load (ETL) of detected or received data. Alternatively or in addition, the real-time analytics engine 208 may generate insights from all created VA descriptions, alarms from errors and other types of events. The real-time analytics engine 208 may provide a user interface to that provide display the real-time analytics information. The user interface may be customized for a particular virtual agent. For example, some types of the information generated by the real-time analytics engine 208 may be relevant for some virtual agents but not for others.

The diagnostics controller 210 may provide an automated way of testing the virtual agent 104. Automated testing may include testing the virtual agent 104 using a test input and comparing the results of the test to an expected result. The test input may include a natural language input. The expected result may include an expected natural language response. The diagnostics controller 210 may receive dynamic updates to the test cases included in the diagnostics controller 210.

The chat service 212 may include a service that allows users to send and/or receive natural language information with the virtual agent. The chat service 212 may include ready-made interface for the virtual agent 104 that users can embed in their applications, such as web pages and/or mobile applications. The chat service 212 may utilize one or more communication channels. The chat service 212 may receive dynamic updates for which communication channels should be used and/or how to use them. Alternatively, the chat service 212 may receive dynamic updates such that a user interface interface is updated in real-time.

Figure 3:
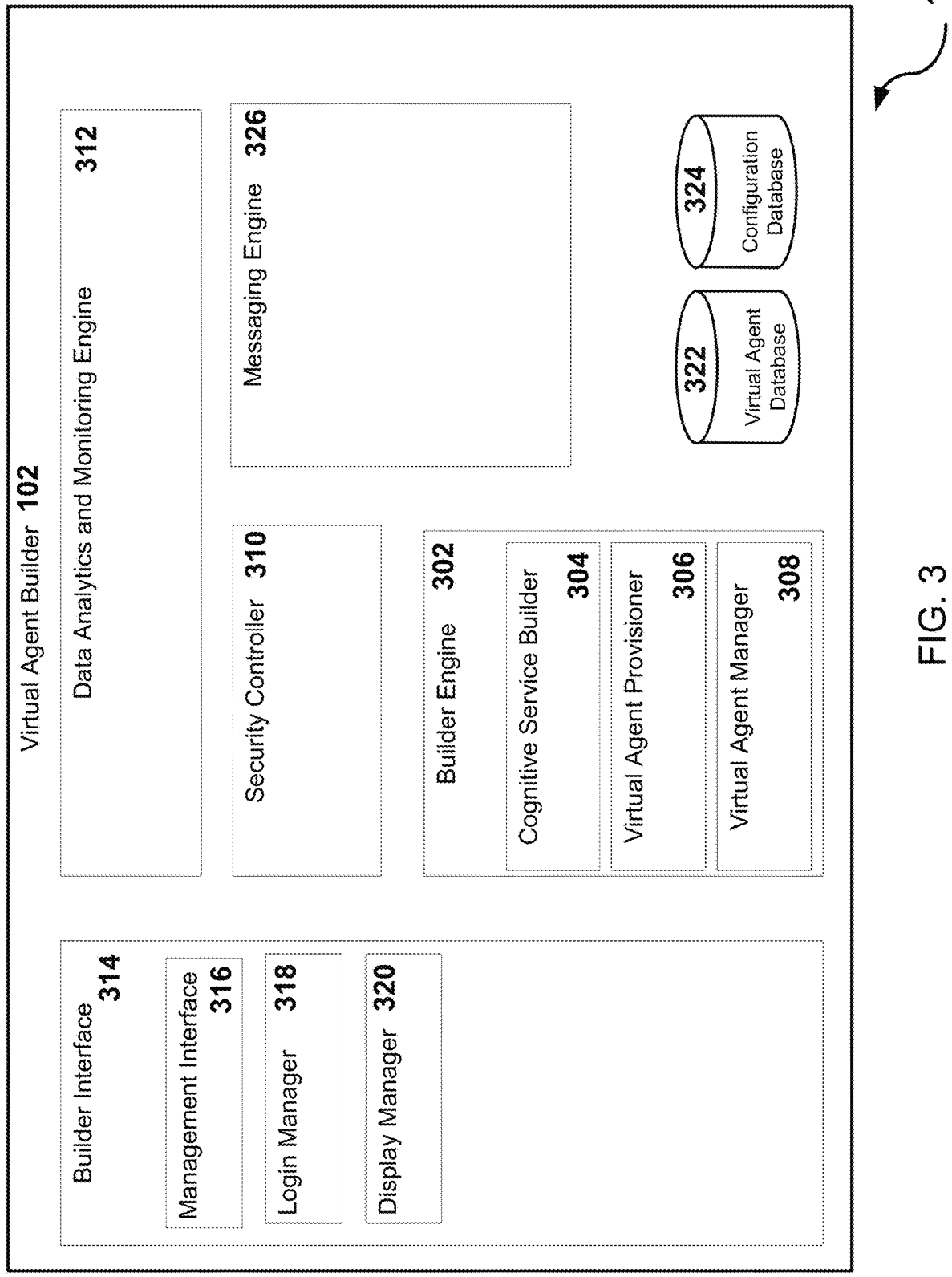
FIG. 3 illustrates an example of a virtual agent builder.

FIG. 3 illustrates an example of the virtual agent builder 102. The virtual agent builder 102 may include a builder engine 302. The builder engine 302 may create and/or configure one or more virtual agents. The builder engine 302 may generate a customized virtual agent that is configured to utilize a specific communication channel(s), cognitive service provider(s), API(s), communication protocol(s), user interface(s), and/or external system(s). The builder engine 302 may include a cognitive service builder 304, a virtual agent provisioner 306, and a virtual agent builder manager 308. Additional description of the cognitive service builder 304, the virtual agent provisioner 306 and the virtual agent builder manager 308 is respectively provided in FIGS. 4-6.

The virtual agent builder 102 may be implemented with additional or fewer components that illustrated in FIG. 3. For example, the virtual agent builder 102 may include a builder interface 314. The builder interface 314 may include a set of rules, procedures, or routines used to interact with the virtual agent builder 102 and/or subcomponents of the virtual agent builder 102. For example, the builder interface 314 may include an application-programming interface (API), a command line interface, a representational state transfer (REST) interface, and/or any other type of machine and/or user interface.

The virtual agent builder 102 may include a security controller 310. The security controller 310 may control the authentication and authorization for access to the virtual agent builder 102. Alternatively or in addition, the security controller 310 may store and/or manage the user credentials used to access the virtual agent builder 102 and/or features provided by the virtual agent builder 102. In some examples, users may be associated with various permission levels that grant or deny access to the virtual agent builder 102 and/or features provided by the virtual agent builder 102.

The virtual agent builder 102 may include a data analytics engine and monitoring engine 312. The data analytics and monitoring engine 312 may conduct data processing activities such as ETL of event data, alarms from errors and other types of events. In some examples, the data analytics and monitoring engine 312 may receive events or detect errors that occur during the generation, provisioning, and/or deployment of one or more virtual agents. Alternatively or in addition, the data analytics and monitoring engine 312 may receive events or detect errors that occur by the deployed virtual agents. The data analytics and monitoring engine may, for example, determine a stage when an error occurs. For example, the data analytics and monitoring engine 312 may determine one or more errors occurred during virtual agent generation, virtual agent provisioning, virtual agent deployment, and/or virtual agent runtime. In some examples, the data analytics and monitoring engine 312 may aggregate data received from multiple virtual agents.

In some examples, the data analytics and monitoring engine 312 may determine root causes of errors. For example, the data analytics and monitoring engine 312 may determine that a particular cognitive service engine is causing a large quantity of errors. Alternatively or in addition, the data analytics and monitoring engine 312 may determine that a particular dialog corpus is generating errors. For example, the data analytics and monitoring engine 312 may determine that conversion of a particular dialog corpus to one or more dialog models is generating errors. Alternatively or in addition, the data analytics and monitoring engine 312 may determine that conversion of a particular dialog corpus is causing one or more cognitive service engine to generate errors.

The builder interface 314 may include a management interface 316, a login manager 318 and/or a display manager 320. The management interface 316 may provide an interface for creating, searching, updating, configuring, deleting virtual agents. For example, the builder interface 314 may communicate a list of virtual agents managed by the virtual agent builder 102. Alternatively or in addition, the management interface 316 may provide information corresponding to one or more virtual agents base on query requests. In some examples, the management interface 316 may send or receive messages that allow cause the virtual agent builder 102 to create, delete, update, or otherwise manage a virtual agent. Alternatively or in addition, the management interface 316 may receive deployment configurations or update to deployment configurations for one or more virtual agent.

The login manager 318 may provide a user or machine interface for users to login and/or manage user names and passwords. For example, the login manager 318 may send and/or receive credential information for users of the virtual builder 102 and/or virtual agents. For example, the login manager may allow user credentials to be updated, deleted and/or created. The display manager 120 may generate interactive display for the virtual agent builder 102 and/or one or more virtual agent. For example, the display manager may generate an interactive display interface. The interactive display interface may provide graphical user interfaces that enable a user to manage virtual agents and/or provide configuration information.

The virtual agent builder 102 may include a virtual agent database 322 and/or a configuration database 324. The virtual agent database 322 may store information used to access, reference, and/or communicate with one or more virtual agents. For example, the virtual agent database may track associate one or more virtual agent with one or more dialog corpus, one or more communication channel, and/or one or more cognitive service engine. The configuration database 324 may store deployment configurations for a particular virtual agent. For example, particular hosted-cloud platforms be configured with login credentials, operating system configurations, service configurations, and/or other configures used to host a service such as the virtual agent 104. Alternatively or in addition, the virtual agent 104 may be configured with particular settings parameters that the configuration database 324 tracks. In some examples, the configuration database 324 may further include settings parameters for services that the virtual agent 104 uses. For example, the configuration database 324 may include setting parameters for one or more cognitive service engine and/or one or more communication channel. The virtual agent database and the configuration database may be separate databases. Alternatively, the virtual agent database and the configuration database may be included in the same database.

The virtual agent builder 102 may include a messaging engine 326. The messaging engine 326 may facilitate communications between the builder engine 302, the cognitive service builder 304, the virtual agent provisioner 306, the virtual agent builder manager 308, the security controller 310, the data analytics and monitoring engine 312, the builder interface 314, the management interface 316, the login manager 318, the display manager 320, the virtual agent database 322, the configuration database 324, and/or any other component or subcomponent of the VA builder. Alternatively or in addition, the messaging engine 326 may facilitate communication between the virtual agent builder 102 and other services and/or devices, such as the virtual agent 104, the cognitive service engines 108, the communication channels 110, or external systems. An example of the messaging engine 326 may include APACHE KAFKA, or any other commercially available or custom messaging engine.

In some examples, components or subcomponents of the system and/or the virtual agent builder 102 may include a producer and/or consumer that sends and/or receives messages. Alternatively or in addition, the components or subcomponents of the system 100 and/or virtual agent builder 102 may register submit or receive messages from topics registered with the messaging engine. In some examples, the messaging engine may be secured and included in a backend of the virtual agent builder 102. The builder interface 314 may expose human or machine interfaces that allow access to the features of the virtual agent builder 102. In other examples, one or more component or subcomponent of the virtual agent builder 102 may provide human or machine interfaces that allow access to the features of each component or subcomponent.

Figure 4:
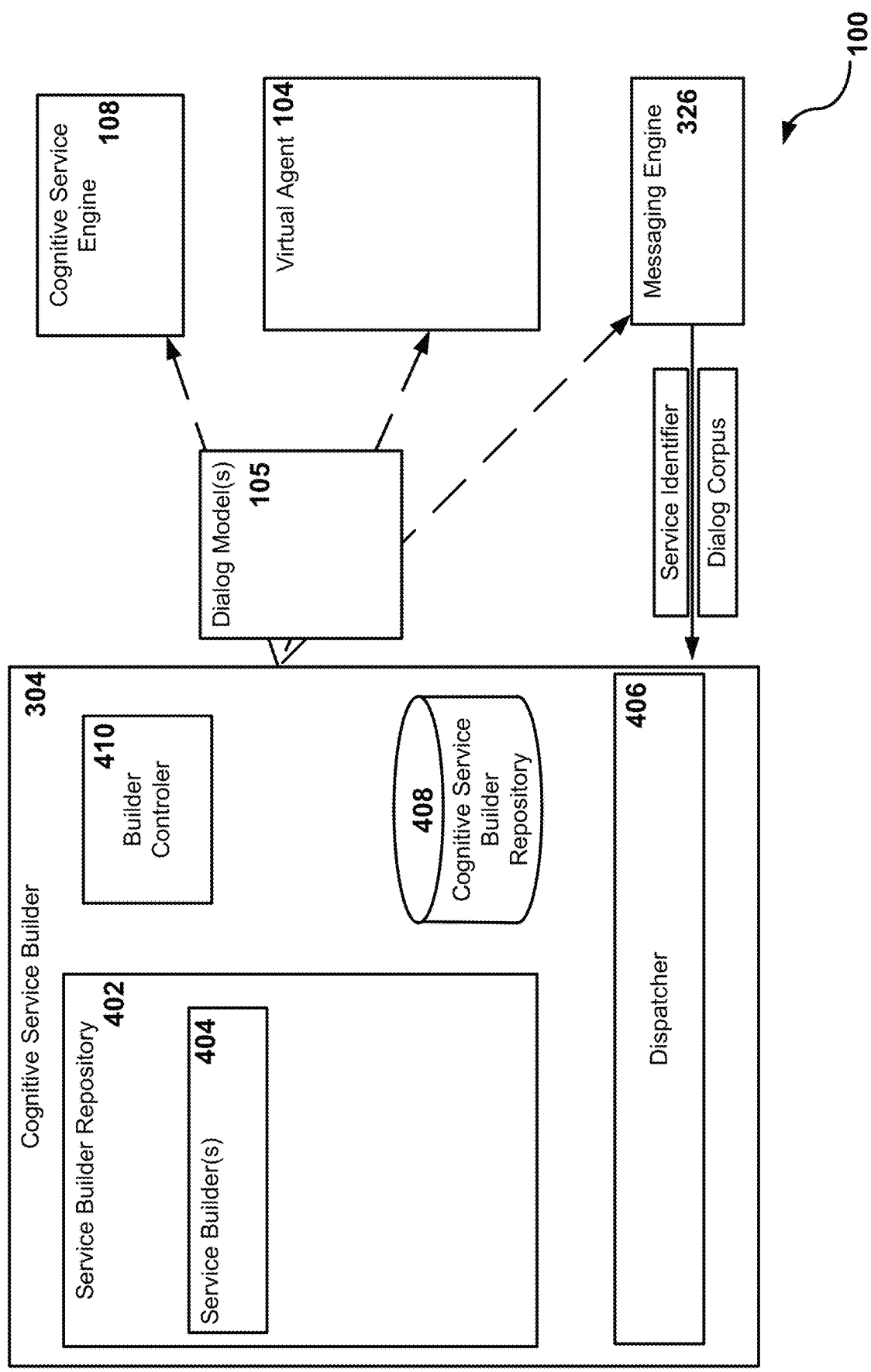
FIG. 4 illustrates an example of a cognitive service builder.

FIG. 4 illustrates an example of the cognitive service builder 304. The cognitive service builder 304 may include a service builder repository 402. The service builder repository 402 may include a service builder 404 or multiple service builders.

The service builder 404 may generate the dialog model 105 and/or the dialog service application 206 configured for a corresponding cognitive service engine. For example, the service builder 404 may analyze and/or parse the dialog corpus 103 to generate the dialog model 105 or multiple dialog models. In some examples, the service builder 404 may include template logic. The service builder 404 may replace template information with information from the dialog corpus 103 to generate the dialog model 105.

In some examples, the service builders 404 may generate and/or configure the dialog model 105 on the cognitive service engine 108 and/or the virtual agent 104. For example, the service builder 404 may communicate directly with the cognitive service engine 108 to generate, configure and/or deploy the dialog model 105 on the cognitive service engine 108. Alternatively or in addition, the service builder 404 may communicate directly with the virtual agent 104 to generate, configure, and/or deploy the dialog model 105 on the dialog service application 206 of the virtual agent 104. In some examples, the service builders 404 may also generate, configure, and/or deploy the dialog model 105 on the virtual agent 104.

In examples with multiple service builders, one or more of the service builders may be configured for a separate cognitive service engine, or group of cognitive service engines. For example, each of the service builders 404 may generate customized dialog model configured for a corresponding cognitive service engine. Alternatively or in addition, the cognitive service builder 304 may receive the service identifier and/or the dialog corpus 103. The cognitive service builder 304 may user and/or execute the service builder 404 associated with the service identifier to generate the dialog model 105.

The cognitive service builder 304 may include a dispatcher 406. The dispatcher 406 may handle requests from different input sources, such as the messaging engine and/or HTTP requests and routes the requests to one or more service builder 404. Alternatively or in addition, the dispatcher 406 may publish messages to one or more of the messaging engine, the virtual agent 104, the cognitive service engine 108, and/or external system. For example, the dispatcher 406 may communicate the dialog model 105 to the cognitive service engine 108, the virtual agent 104, and/or the messaging engine.

The cognitive service builder 304 may include a cognitive service builder database 408. The cognitive service builder database 408 may stores service builder details, such as the associations between available services builders and respective cognitive service engines. Alternatively or in addition, the cognitive service builder database 408 may store job details for requests to generate one or more dialog models. For example, the cognitive service builder 304 may receive an asynchronous request to build the dialog model 105 configured for the cognitive service engine 108. The cognitive service builder 304 may track the progress and/or status of the service builder 404. In some examples, the cognitive service builder database 408 may store the service builder repository 402 and/or the service builders 404.

The builder controller 410 may provide a human or machine interface that that receives or performs commands for the builder interface. In some examples, the builder interface may send, receive, and/or execute commands for building, configuring, and/or deploying the dialog model 105 to a cloud foundry-based environment like IBM CLOUD. Alternatively or in addition, the builder controller 410 may facilitate the generation, communication, configuration and/or deployment of the dialog model 105 to the cognitive service engine 108, the virtual agent 104, and/or the messaging engine.

The build controller 410 may enable real-time updates to one or more virtual agents. For example, the builder controller 410 may receive a cognitive service update request. The cognitive service update request may include a second service identifier corresponding to a new cognitive service engine. The build controller may select a corresponding service builder. The build controller may generate, by execution of the corresponding service builder logic, a new dialog model.

Figure 5:
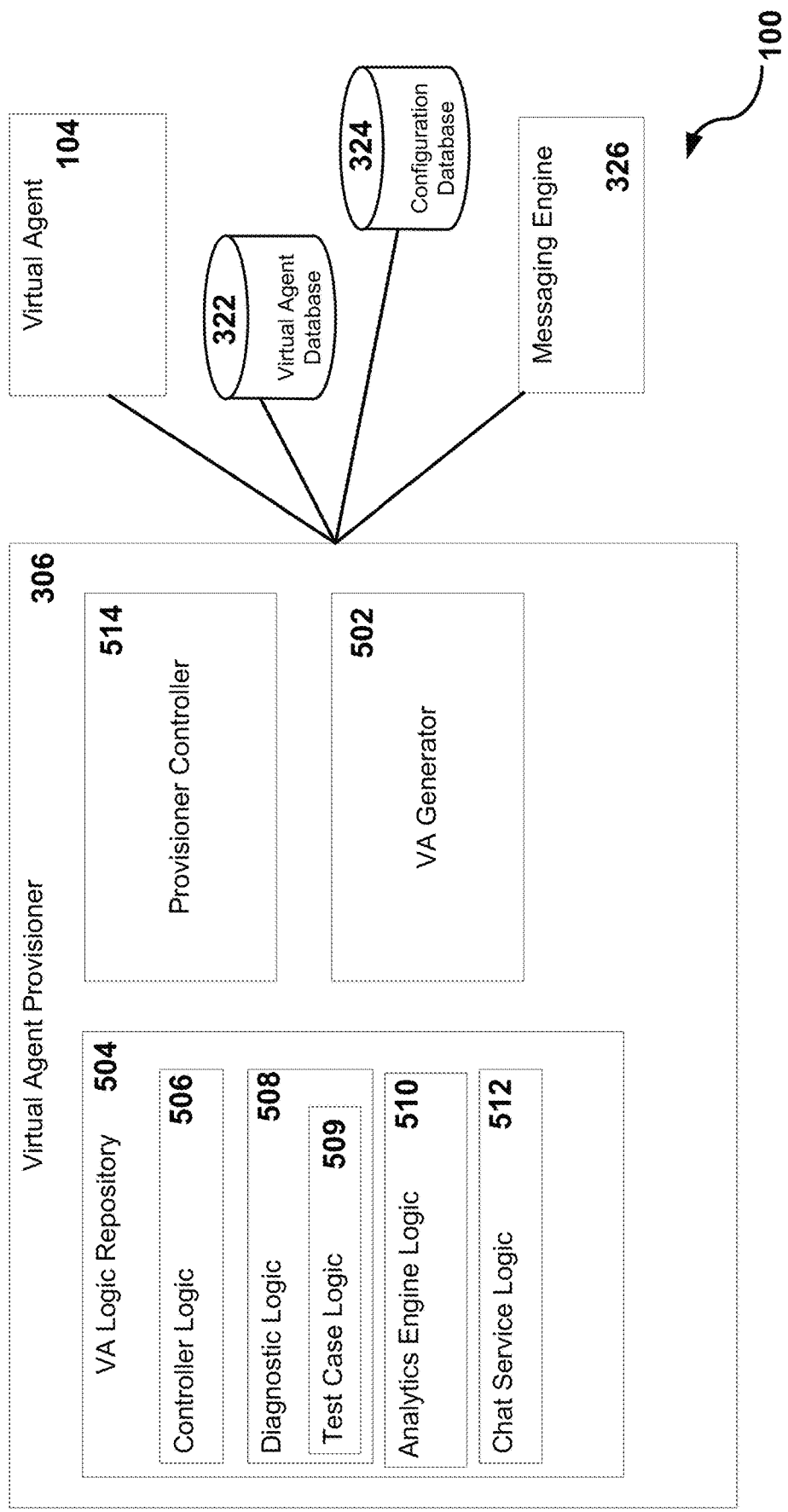
FIG. 5 illustrates an example of the virtual agent provisioner.

FIG. 5 illustrates an example of the virtual agent provisioner 306. The virtual agent provisioner (VA Provisioner) 306 may instantiate and/or configure the virtual agent 104 for a particular implementation. For example, the VA provisioner 306 may configure the virtual agent 104 with customized logic, user interfaces, dialog models, test cases, analytics, and other features of the virtual agent 104.

The VA provisioner 306 may include a VA generator 502 and VA logic repository 504. The VA generator 502 may access the VA logic repository 504 to generate and/or configure the virtual agent 104. For example, the VA generator 502 may receive provisioning parameters. The provisioning parameters may include information or instructions used by the VA generator 502 to generate the virtual agent 104. For example, the provisioning parameters may include the service identifier to identify one or more cognitive service engine to be used by the virtual agent 104. Alternatively or in addition, the provisioning parameters may include or identify the dialog corpus 103 and/or the communication channel 110. In other examples, the provision parameters may include any other information used to generate a particular type of virtual agent 104.

The VA generator 502 may access and/or use VA logic repository 504 to generate the virtual agent 104. In some examples, the VA generator 502 may execute the VA logic repository 504 to generate or configure the virtual agent 104. Alternatively, the VA generator 502 may obtain the VA logic repository 504 include it in the virtual agent 104. In some examples, the virtual agent 104 may be deployed and the VA generator 502 may send the VA logic to the virtual agent 104 during runtime.

The VA logic repository 504 may include logic that is executed to either generate the virtual agent 104 or components of the virtual agent 104. In some examples, the logic of the VA logic repository 504 may be executed to generate or configure the virtual agent 104. Alternatively, the VA logic repository 504 may include a template logic that is combined with one or more provisioning parameter to generate a set of instructions that are included in the virtual agent 104.

The VA logic repository 504 may include controller logic 506. The controller logic 506 may include logic used to generate the VA controller 204 of the virtual agent 104 (See FIG. 2). For example, the controller logic 506 may generate the VA controller 204. Alternatively or in addition, the controller logic 506 may include pre-built instructions and/or pre-build VA Controllers. The controller logic 506 may customize the VA controller 204 based on provisioning parameters received from the messaging engine or some other source. Alternatively or in addition, the controller logic 506 may include template logic. The template logic may be combined with configuration parameters to create customized logic included in the VA controller 204.

The VA logic repository 504 may include diagnostic logic 508. The diagnostic logic 508 may include logic included in or used to generate the diagnostics controller 210 of the virtual agent 104 (See FIG. 2). For example, the VA generator 502 may use the diagnostic logic 508 to generate the diagnostics controller 210. The VA generator 502 may configure the diagnostics controller 210 to test the virtual agent 104 based on one or more test case.

In some examples, the diagnostic logic 508 may generate a test case, or multiple test cases. The test case may test the components of the virtual agent 104, the cognitive service engine 108, and/or the communication for proper operation and configuration. For example, the test case may test the dialog model 105 based on the dialog corpus 103. As discussed in reference to FIG. 7, the dialog corpus may include an intent request and an intent response. An intent request may serve as an input to a test and the response may be used as an expected result. Accordingly, the dialog corpus 103 may provide the inputs and expected results for the test case. In some examples, the test case and/or the diagnostics controller 210 of the virtual agent 104 may communicate a test message to the virtual agent 104 based on at least one of the intent requests of the dialog corpus 103. The test case may compare an output message generated by the virtual agent 104 to an expected result based on at least one of the intent responses of the dialog corpus 103. In other examples, the test case and/or the diagnostics controller 210 may communicate the test message to the cognitive service engine 108 and evaluate a natural language processing result received from the cognitive service engine 108 based on the dialog corpus 103.

In some examples, the diagnostic logic 508 may include test case logic 509. The test case logic may include an input field and a result field. The diagnostic logic 508 and/or the virtual agent generator may replace the input field with intent request information. The intent request information may correspond to at least one of the intent requests of the dialog corpus 103. Alternatively or in addition, dialogistic logic and/or the VA generator 502 may replace the result field with intent response information. The intent response information may correspond to at least one of the intent responses of the dialog corpus 103. The diagnostic logic 508 and/or the VA generator 502 may include the test case logic 509 configured with the intent request information and intent response information in the dialog controller of the virtual agent 104. The dialog controller may execute the test case logic 509 to test the virtual agent 104, the cognitive service engine 108, and/or the communication channel 110.

The diagnostic logic 508 may be customized based on provisioning parameters received from the messaging engine or some other source. For example, the provisioning parameters may include the dialog corpus 103. The VA generator 502 may generate one or more test cases for the virtual agent 104.

The VA logic repository 504 may include analytics engine logic 510. The analytics engine logic 510 may include logic included in or used to generate the real-time analytics engine 208 of the virtual agent 104 (see FIG. 2). For example, the VA generator 502 may generate the real time analytics engine and include the real-time analytics engine logic 510 in the real-time analytics engine 208 of the virtual agent 104 (FIG. 2). Alternatively, the analytics engine logic 510 may generate the real-time analytics engine 208 using the real-time analytics engine logic 510. In some examples, the VA generator 502 may customize the analytics engine logic 510 and/or the real-time analytics engine 208 based on the provisioning parameters. For example, the provisioning parameters may specify the type of information to monitor and/or track such as number of chat sessions, number of resolved issues, number of errors, etc.

In some examples, the analytics engine logic 510 may be associated with an analytics type identifier. For example, the analytics type identifier may be provided to the virtual agent builder 102 and/or the VA provisioner 306 to generate customized real-time analytics for the virtual agent 104. The analytics type identifier may identify the logic and/or the types of information that should be monitored and/or displayed on a virtual agent. The virtual agent may search the VA logic repository 504 for the analytics engine logic associated with the analytics type identifier. The VA generator 502 may generate and/or configure the real-time analytics engine 208 for the virtual agent 104. The real-time analytics engine 208 may include the selected analytics engine logic. The analytic engine logic 510 may cause the real-time analytics engine to monitor the one or more variables and/or display a user interface that includes the one or more variables.

The analytics engine logic 510 may be combined with configuration parameters received or accessed by the virtual agent and/or the VA provisioner. For example, the VA provisioner may access or receive parameters that identify the information used to communicate with external systems that receive analytics data from the virtual agent. The analytics logic may include logic, which communicates with the external system according to a protocol of the external system. The configuration parameters may specify IP addresses, Web addresses, credentials, or other information used to communicate with the external system according to the protocol of the external system. The configuration parameters may be received from a user interface and/or accessed from the configuration database 324.

The VA logic repository 504 may include chat service logic 512. The chat service logic 512 may include logic included in or used to generate the chat service 212 for the virtual agent 104 (see FIG. 2). For example, the VA generator 502 may generate the chat service 212 and include the chat service logic 512 in the chat service 212. Alternatively, the chat service logic 512 may generate the chat service 212. In some examples, the VA generator 502 may customize the chat service logic 512 and/or the chat service 212 based provisioning parameters. For example, the chat service logic 512 may include logic for communication over particular communication channels. The VA generator 502 may include particular chat service logic in the chat service 212 to create a customized implementation of the virtual agent 104 communicates over selected communication channels.

The virtual agent provisioner 306 may be implemented in various ways and may include fewer or additional components. In some example, the virtual agent provisioner may include a provisioner controller 514. The provisioner controller 514 may send and or receive commands and/or provide an interface to implement the features of the virtual agent provisioner 306. In some examples, the provisioner controller 514 may provide an interface to create the virtual agent 104. Alternatively or in addition, the provisioner controller 514 may receive messages that cause the virtual agent provisioner 306 to reconfigure the virtual agent using the controller logic 506, the diagnostic logic 508, the analytics engine logic 510 and/or the chat service logic 512 in real time.

Figure 6:
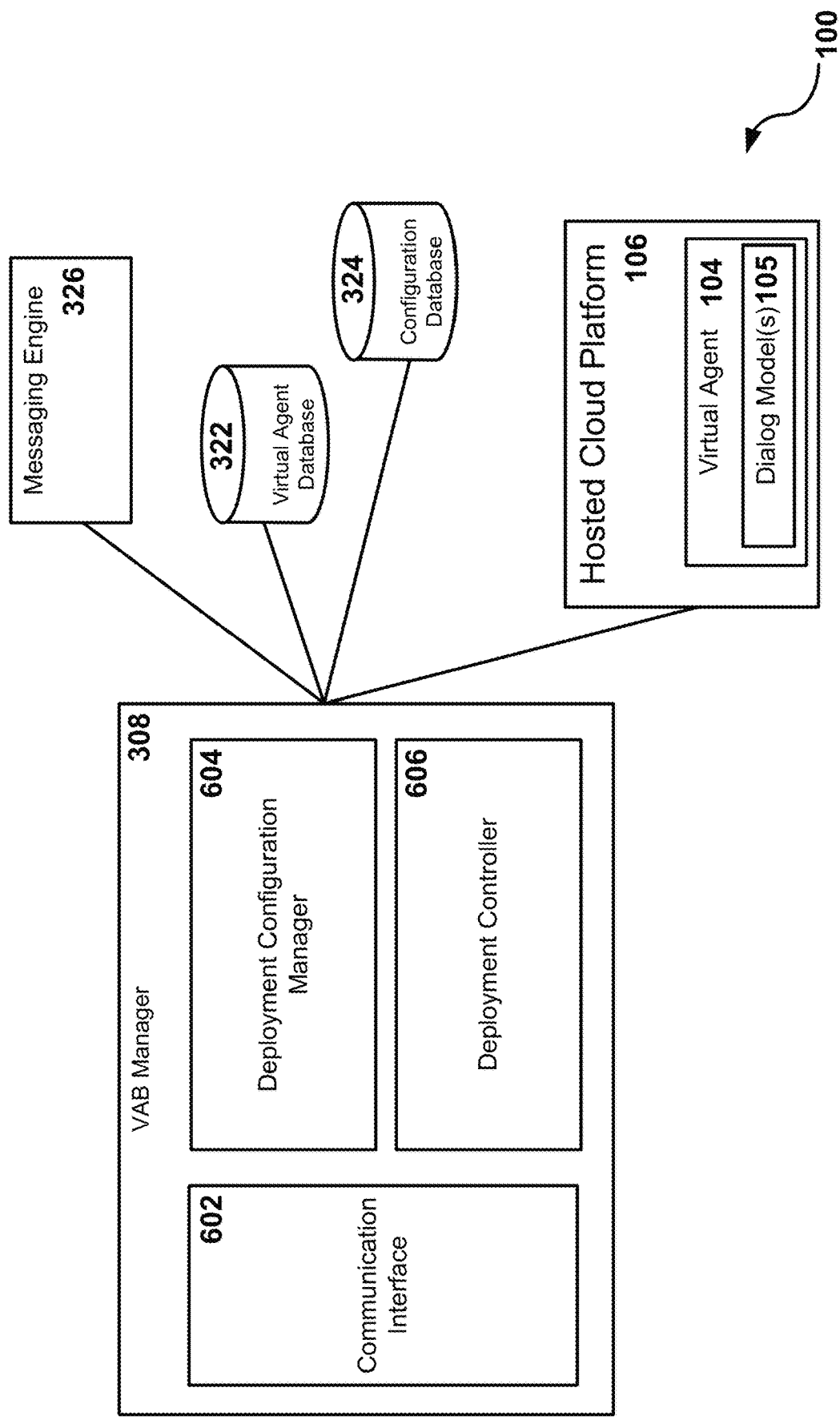
FIG. 6 illustrates an example of a virtual agent builder manager.

FIG. 6 illustrates an example of the virtual agent builder manager 308. The virtual agent builder manager (VAB manager) 308 may include a communication interface 602, a deployment configuration manager 604, and the deployment controller 606.

The communications interface 602 may include an API, or some other interface, that permits messages to be sent and/or received form the VAB manager 308. In some examples, the communications interface 602 may follow various protocols such as REST. Alternatively or in addition, the communications interface 602 may provide a command line interface that receives and/or responds to input commands. The communications interface 602 may receive messages from sources internal and/or external to the virtual agent builder 102. Alternatively or in addition, the communications interface 602 may a user interface, such as command line prompts or a web page. The user interface may communicate calls to the VAB Manager in order to create, read, update, or delete the virtual agent 104 or configuration data for the virtual agent 104.

The deployment configuration manager 604 may receive, provide, and/or store deployment configurations that contains the credentials and settings for the virtual agent 104 and/or the cloud hosted platform 106 (see FIG. 1) where the VA will be deployed. Alternatively or in addition, the deployment configuration may include an identifier of one or more communication channel that the virtual agent 104 is configured for. The deployment configuration may include parameters that are used configure the one or more configuration channel. In other examples, the deployment configuration may include an identifier of one or more cognitive service engines that the virtual agent 104 is configured for. The deployment configuration may include parameters that are used to configure the one or more cognitive service engines. The deployment manager may add, update, delete, rand/or retrieve a configuration for the virtual agent 104. In some examples, the deployment configuration manager 604 may also notify a user, using a web socket for example, whenever a deployment configuration is successfully added, deleted, updated, or had an error during one of the operations.

The deployment controller 606 may communicate with other portions of the virtual agent builder 102 and/or the cognitive service builder 304 to generate and/or manage the virtual agent 104. For example, the deployment controller 606 may add, update, delete, and/or retrieve virtual agent information from the virtual agent database (VA repository) 322. In some examples, the deployment controller may communicate with the cognitive service builder 304 to generate the dialog model 105. Alternatively or in addition, the deployment controller 606 may communicate with the provisioner, which generates and configures the virtual agent 104 for a particular implementation and/or a particular hosted-cloud environment. The deployment controller may also update and/or notifying a client, for example using a WebSocket, whenever a VA was successfully added, deleted, updated, or had an error during one of the operations.

Figure 7:
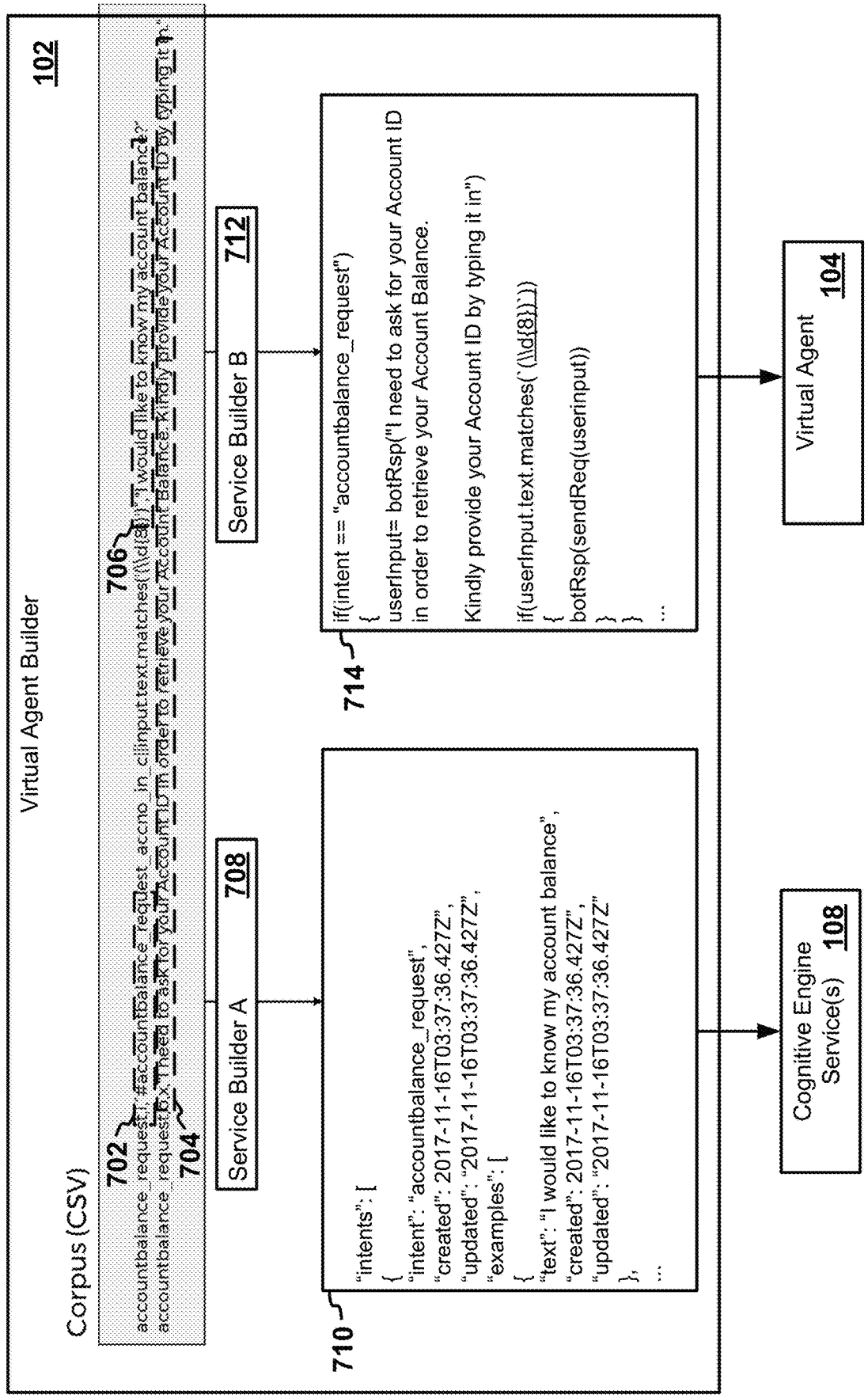
FIG. 7 illustrates an example of a dialog corpus and service builders.

FIG. 7 illustrates an example of the dialog corpus 103 and the service builders 404. As previously discussed in reference to FIG. 1, the dialog corpus 103 may include a model used to provide intelligent dialog by a machine. The dialog corpus 103 may include intelligent dialog for a particular area of knowledge, such as user support for a product or service. In some examples, the dialog corpus 103 may include an intent parameter 702 and an intent response parameter 704, and a natural language input parameter 706.

The intent parameter 702 may include a parameter that identifies or represents an intent identified through natural language understanding. The intent of a natural language input parameter 706 may refer to the meaning of the natural language input parameter 706. For example, in response to receiving the natural language input parameter 706, the cognitive service engine 108 may provide an intent identifier. In some examples, the intents may be predetermined and the intent parameter 702 included in the dialog corpus 103 may refer to a predetermined intent. The predetermined intent may be stored in a database, such as the cognitive service builder database 408 and/or the service builder repository 402 (FIG. 4). Alternatively or in addition, the predetermined intent may be stored in the cognitive service engine 108. In some examples, the cognitive service engine 108 may provide a list of supported intent identifiers via an API.

The intent response parameter 704 may include a parameter that identifies a natural language response. For example, the intent response parameter 704 may include natural language text that may be used to provide intelligent responses to detected intents. The intent response parameter 704 may be associated with an intent parameter 702 based on one or more request instructions included in the dialog corpus 103. The request instructions may include and/or associate one or more intent parameter 702 with one or more intent response parameter 704. Alternatively or in addition, the request instructions may associate one or more intent parameter 702 with one or more natural language input parameter 706.

As previously discussed in reference to FIG. 4, the service builders 404 may convert the dialog corpus 103 into one or more dialog models. For example, as illustrated in FIG. 7, a first service builder 708 may convert the dialog corpus 103 into a dialog configuration 710. The dialog configuration 710 may be an example of the dialog model 105 that includes configuration parameters used to configure the cognitive service engine 108. Alternatively or in addition, the dialog configuration 710 may include associations between natural language text and intents. For example, the dialog configuration 710 illustrated in FIG. 7 includes an association between the intent identified by "accountbalance_request" and the natural language "I would like to know my account balance". The identifiers of the intents may be predetermined and stored on the cognitive service engine 108. The dialog configuration 710 may follow the protocol of the cognitive service engine 108. The first service builder 708 may include predetermined logic that converts the dialog corpus 103 according to the protocol and/or data formats expected by the cognitive service engine 108. In some examples, the dialog configuration 710 may associate responses with intents. For example, the first service builder 708 may associate the intents with the responses based on the dialog corpus 103.

The cognitive service engine 108 may utilize the dialog configuration 710 to provide natural language processing. For example, the dialog configuration 710 may determine that the natural language text "I would like to know my account balance" is associated with an intent identifier, "accountbalance_request." The cognitive service engine 108 may further determine that the intent identifier "accountbalance_request" is associated with the response "I need to ask for your Account ID in order to retrieve your Account Balance. Kindly provide your Account ID by typing it in." The cognitive service engine 108 may provide response to the virtual agent 104 in either voice or text format.

In other examples, the virtual agent builder 102 may build associations between intents, natural language input, and/or responses. For example, the virtual agent builder 102 may include a second service builder 712. The second service builder 712 may convert the dialog corpus 103 into dialog logic 714. The dialog logic 714 may include an example of the dialog model 105 that includes logic to interact with the cognitive service engine 108 based on the dialog corpus 103. For example, the dialog logic 714 may include instructions and/or computer code that is configured to cause the virtual agent 104 to communicate with the cognitive service engine 108. The dialog logic 714 may communicate natural language input to the cognitive service engine 108. The cognitive service engine 108 may detect an intent and forward an intent identifier corresponding to the intent to the virtual agent 104. The dialog logic 714 may cause the virtual agent 104 to generate a natural language response. In one example, the intent identifier may include "accountbalance_request". In response to receiving the intent identifier "accountbalance_request" from the cognitive service engine 108, the dialog logic 714 may cause the virtual agent 104 to generate the natural language response "I need to ask for your Account ID in order to retrieve your Account Balance. Kindly provide your Account ID by typing it in."

Figure 8:
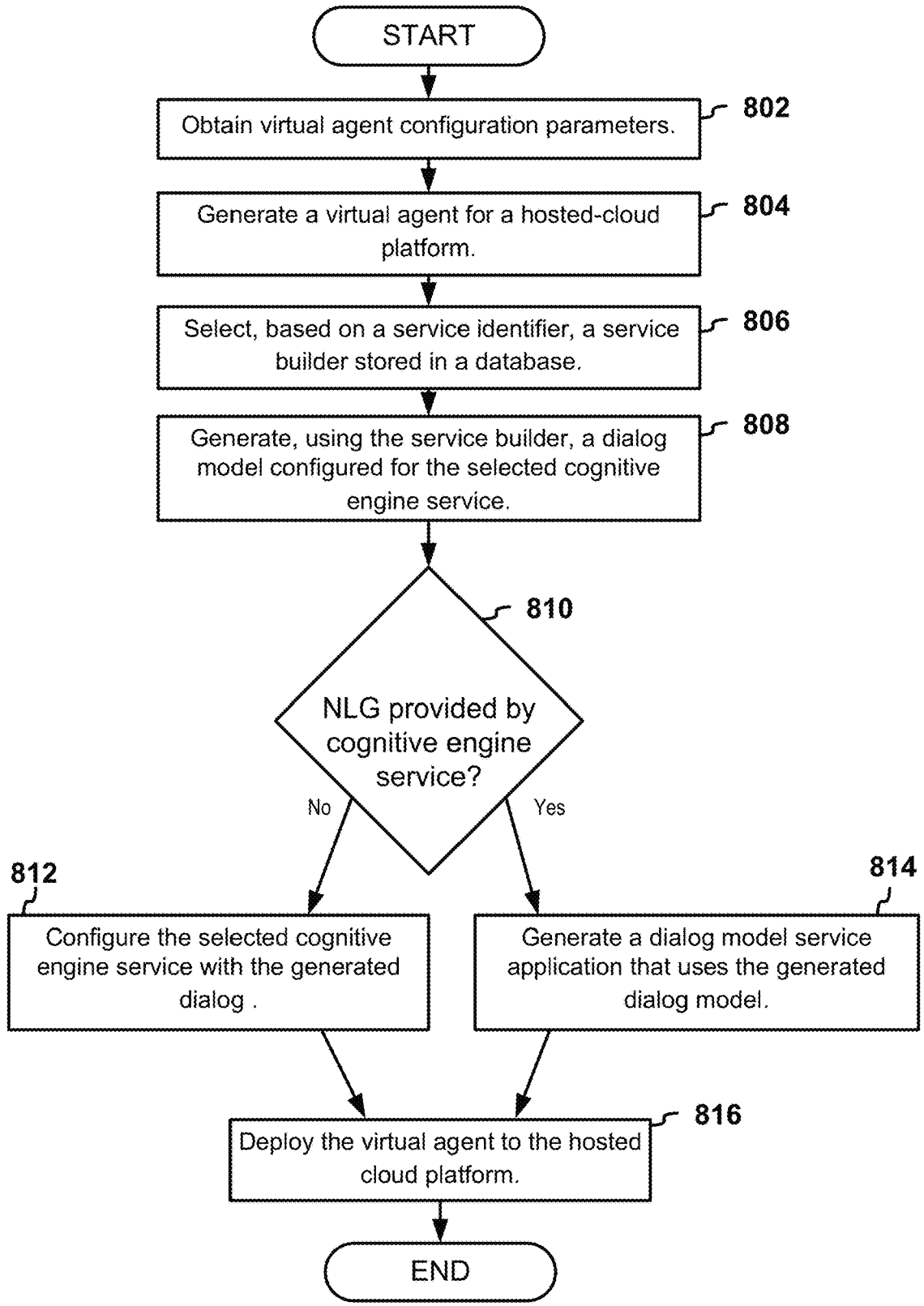
FIG. 8 illustrates an example of a flow diagram for logic of the system.

FIG. 8 illustrates an example of a flow diagram for logic of the system 100. The virtual agent builder 102 may obtain virtual agent configuration parameters (820). The virtual agent configuration parameters may include a service identifier and a dialog corpus identifier. The service identifier may correspond to the cognitive service engine 108. The dialog corpus identifier may correspond the dialog corpus 103. The dialog corpus 103 may include one or more intent requests and one or more intent responses. At least one of the intent requests may be associated with at least one of the intent responses.

The virtual agent builder 102 may generate the virtual agent 104 for the hosted-cloud platform 106 (804). For example, the builder engine 302 may generate and/or configure the virtual agent 104. In some examples, the virtual agent 104 may include instructions to receive natural language input and to respond the natural language input using a selected cognitive service engine. The selected cognitive service engine may be identified by the virtual agent configuration parameters. In some examples, the virtual agent provisioner 306 may generate the virtual agent 104. Alternatively or in addition, the cognitive service builder 304 may generate certain components of the virtual agent 104, such as the dialog service application 206 and/or the dialog model 105.

The virtual agent builder 102 may select, based on the service identifier, the service builder 404 stored in the service builder repository 402 (806). The service builder repository 402 may include the service builders 404 configured to generate respective dialog models. Each of the respective dialog models may be independently configured for a separate selected cognitive service engine. In some examples, the cognitive service builder 304 may select the dialog model 105 based on the virtual agent configuration parameters, such as the service identifier.

The virtual agent builder 102 may generate, using the service builder, the dialog model 105 configured for the selected cognitive service engine (808). For example, the virtual agent builder 102 may generate, by execution of service builder logic associated with the selected service builder, the dialog model 105. In some examples, the virtual agent builder 102 may configure the dialog model 105 for the selected cognitive service engine. For example, the dialog model 105 may include parameters which cause the selected cognitive service engine to process natural language input according to the intent requests and the intent responses included in the dialog corpus 103.

The virtual agent builder 102 may determine whether the selected cognitive service provides natural language generation (810). For example, the virtual agent builder 102 may communicate and/or provision the dialog model 105 differently, depending on the selected cognitive service engine or the service builder. In response to the cognitive service engine 108 providing natural language generation (810, yes), the virtual agent builder 102 may configure the selected cognitive service engine with the generated dialog model (814). For example, the virtual agent builder 102 may communicate the generated dialog model to the cognitive service engine 108. Alternatively or in addition, the virtual agent builder 102 may execute instructions using a protocol provided by the cognitive service engine 108 to configure the cognitive service engine 108 with the dialog model 105. In response to the cognitive service engine 108 not providing natural language generation (or the natural language generation provided by the selected cognitive service engine being used) (810, no), the virtual agent builder 102 may generate a dialog model service application that uses the generated dialog model to interact with the selected cognitive service engine.

The virtual agent builder 102 may deploy the virtual agent to the hosted-cloud platform 106. For example, the VAB manager 308 may coordinate deployment and configuration of the virtual agent 104 to the hosted-cloud platform 106. In some examples, the VAB manager may access deployment parameters stored in a configuration database 324 to deploy the virtual agent 104. Alternatively or in addition, the VAB manager may receive the virtual agent configuration parameters to deploy and/or configure the virtual agent 104. In further examples, the VAB manager 308 may facilitate the reconfiguration of the virtual agent 104 on the hosted-cloud platform 106 in real time.

The logic of the system may include additional or fewer steps than those indicated in the logic flow diagrams. For example, the VA provisioner 306 may generate a diagnostics controller 210 for the virtual agent 104. The diagnostics controller 210 may be generated based on or include the diagnostics controller logic. The diagnostics controller 210 may test the virtual agent 104 based on a test case. The test case may communicate a test message to the virtual agent 104 based on at least one of the intent requests of the dialog corpus 103. The test case may compare an output message of the virtual agent 104 to an expected result based on at least one of the intent responses of the dialog corpus 103.

Figure 9:
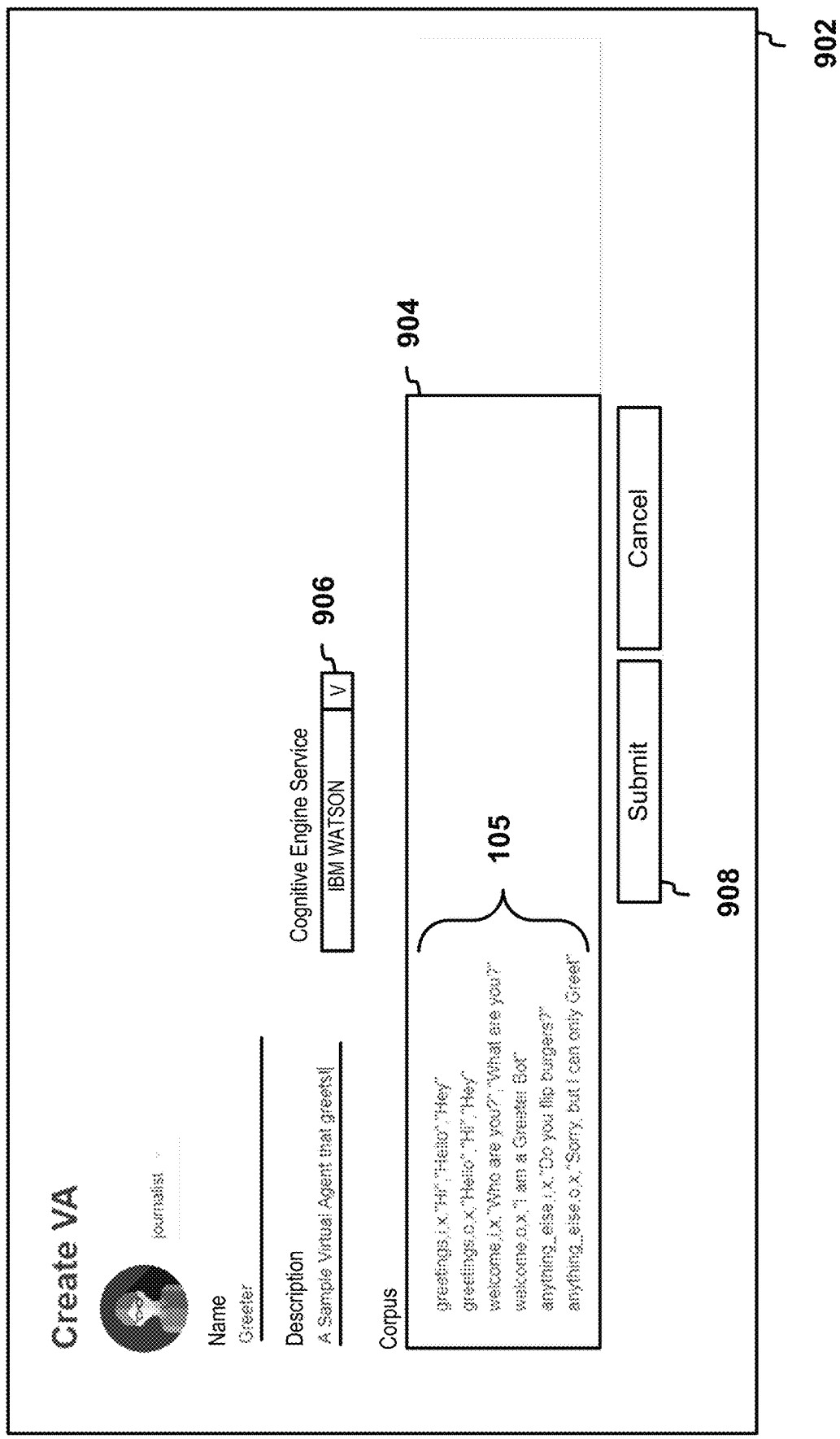
FIG. 9 illustrates an example of a graphical user interface.

FIG. 9 illustrates an example of a graphical user interface 902 for the virtual agent builder 102. The graphical user interface 902 may improve human-computer interactions by increasing the speed and efficiency with which virtual agents may be built and/or deployed. The graphical user interface 902 may include a first control 904 configured to receive the dialog corpus 103. For example, a user may input the dialog corpus 103 to a text field as illustrated in FIG. 9. In other examples, the first control 902 may enable selection of one or more predetermined dialog corpus. For example, the dialog corpus 103 may have previously been submitted to the virtual agent builder 102 and stored by the virtual agent builder 102. The first control 902 may receive the dialog corpus selection 112 (FIG. 1) and/or an identifier of one or more predetermined dialog corpus.

The graphical user interface 902 may include a second control 906 configured to receive the service selection 114 (FIG. 1). In some examples, the second control 906 may display identifiers of multiple cognitive service engines. The second control 906 may allow selection of one or more of the cognitive service engines 108.

The graphical user interface 902 may include a third control 908 configured to generate a trigger to build, configure, and/or deploy the virtual agent 104. The third control 908 may enable a "one-click" creation, configuration, and/or deployment of the virtual agent 104. For example, in response to detection of user input directed to the third control 908, the virtual agent builder 102 may generate the virtual agent 104, configure the virtual agent 104 for use with the selected cognitive service provider, and/or deploy the virtual agent 104 to the hosted-cloud platform 106.

The graphical user interface 902 illustrated in FIG. 9 may include additional and/or fewer features than those illustrated in FIG. 9. In some examples, the graphical user interface 902 may include a fourth control that enables the selection of one or more communication channels for the virtual agent 104. Alternatively or in addition, the graphical user interface 902 may include one or more controls configured to receive deployment parameters related to the cognitive service engine 108 and/or the communication channel.

The system 100 may be implemented with additional, different, or fewer components than illustrated. Each component may include additional, different, or fewer components. For example, the virtual agent builder 102 may include builder engine 302 with or without the builder interface 314, the security controller 310, the data analytics and monitoring engine 312, the messaging engine 326, the VA repository 322 and/or the configuration database 324. The builder engine 302 may include the cognitive service builder 304 with or without the virtual agent provisioner 306 and/or the agent manager 308.

Figure 10:
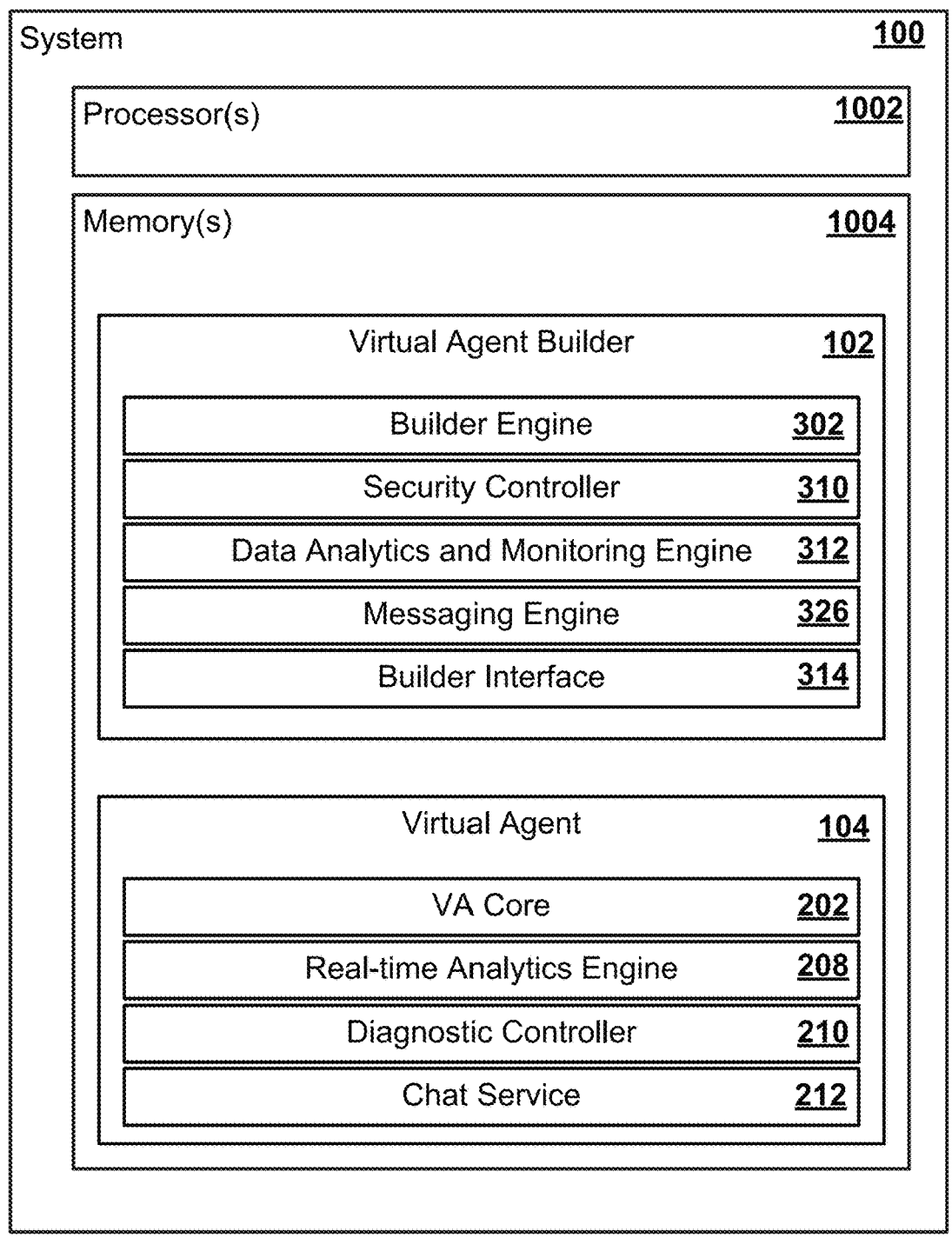
FIG. 10 illustrates an example of a system that includes a processor and a memory.

FIG. 10 illustrates an example of the system 100 that includes a processor 1002 and a memory 1004. The processor 1002 may be in communication with the memory 1004. In one example, the processor 1002 may also be in communication with additional elements, such as a network interface (not shown). Examples of the processor 1002 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1002 may be one or more devices operable to execute logic. The logic may include computer executable instructions or computer code stored in the memory 1004 or in other memory that when executed by the processor 1002, cause the processor 1002 to perform the features implemented by the logic of virtual agent, the virtual agent builder and/or the system 100. The computer code may include instructions executable with the processor 1002.

The memory 1004 may be any device for storing and retrieving data or any combination thereof. The memory 1004 may include non-volatile and/or volatile memory, such as a random access memory (RAM), a read-only memory (ROM), an erasable programmable read-only memory (EPROM), or flash memory. Alternatively or in addition, the memory 1004 may include an optical, magnetic (hard-drive) or any other form of data storage device.

The memory 1004 may include at least one virtual agent builder and/or virtual agent. Alternatively or in addition, the memory may include any other component or subcomponent previously discussed, such as the builder engine 302, the security controller 310, the data analytics and monitoring engine 312, the messaging engine 326, the builder interface 314, the VA core 202, the real-time analytics engine 208, the diagnostic controller 210, the chat service 212 and/or other components of the system 100 described herein.

The system 100 may be implemented in many different ways. For example each component of the system may include a circuit or circuitry. Each circuit or circuitry may be hardware or a combination of hardware and software. The circuitry may include the virtual agent builder 102 and/or the virtual agent, and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 1004, for example, that comprises instructions executable with the processor 1002 or other processor to implement one or more of the features of the circuitry. When any one of the circuitry includes the portion of the memory that comprises instructions executable with the processor 1002, the circuitry may or may not include the processor 1002. In some examples, each circuitry may just be the portion of the memory 1004 or other physical memory that comprises instructions executable with the processor 1002 or other processor to implement the features of the corresponding circuitry without the circuitry including any other hardware. Because each circuitry includes at least some hardware even when the included hardware comprises software, each circuitry may be interchangeably referred to as a hardware circuitry.

In some examples, the processor 1002 may include multiple processors and the memory 1004 may include multiple memories. One or more of the processors and/or memories may be included in distributed servers that are physically separated. The servers may communicate over a network or multiple networks. For example, the virtual agent builder may be included in a first server and the virtual agent may be included in a second server. In other examples, the processors and/or memories may be included in a server that virtualizes other servers. For example, multiple virtual servers may share one or more of the processors and/or memories. Physical servers and/or virtual servers may include the virtual agent builder 102, the virtual agent 104, and/or other components of the system 100.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system, the system comprising:
a memory comprising instructions for deployment of a virtual agent; and
a processor, the processor executing the instructions for deployment of the virtual agent that cause the processor to:
generate a graphical user interface, the graphical user interface comprising a first control, a second control, and a third control, the first control configured to enable selection of a cognitive service engine from a plurality of cognitive service engines, the second control configured to receive a dialog corpus, the third control configured to generate a trigger to deploy the virtual agent;
obtain a service identifier of the selected cognitive service engine indicated by the first control;
obtain the dialog corpus received by the second control, the dialog corpus comprising parameters in a first structured format, the parameters comprising a plurality of intent parameters and a plurality of intent response parameters, and a mapping between at least one of the intent parameters and at least one of the intent response parameters;
generate a virtual agent for a hosted-cloud platform, the virtual agent including instructions to receive natural language input and to respond the natural language input using the selected cognitive service engine;
select, based on the service identifier, a service builder stored in a database, the database including a plurality of service builders configured to generate respective dialog models, the respective dialog models independently configured for separate cognitive service engines, wherein the selected service builder is associated with a service builder logic, the service builder logic comprising an instruction to combine at least one of the parameters of the dialog corpus with template logic associated with the service builder;
generate, by execution of the service builder logic associated with the selected service builder, a dialog model based on combination of the template logic with the at least one of the parameters of the dialog corpus, the dialog modal comprising a structured format different from the first structured format, the second structured format configured for the selected cognitive service engine, the dialog model including parameters which cause the selected cognitive service engine to process natural language input according to the intent parameters and the intent response parameters included in the dialog corpus;
depending on the selected cognitive service engine and the service builder, either configure the selected cognitive service engine with the generated dialog model by communication of the generated dialog model to the cognitive service engine, or generate a dialog model service application that uses the generated dialog model to interact with the selected cognitive service engine; and
deploy, in response to detection of the trigger from the third control, the virtual agent to the hosted-cloud platform.

2. The system of claim 1, wherein the instructions for deployment of the virtual agent further cause the processor to:
  generate a diagnostics controller for the virtual agent, the diagnostics controller configured to test the virtual agent based on a test case, wherein the test case communicates a test message to the virtual agent based on at least one of the intent parameters of the dialog corpus, wherein the test case compares an output message of the virtual agent to an expected result based on at least one of the intent response parameters of the dialog corpus.

3. The system of claim 2, wherein the instructions that cause the processor to generate a diagnostics controller for the virtual agent further comprise instructions that cause the processor to:
  access test case logic stored in a logic repository, the test case logic comprising an input field and a result field;
  replace the input field with intent request information corresponding to at least one of the intent parameters of the dialog corpus;
  replace the result field with intent response information corresponding to at least one of the intent response parameters of the dialog corpus; and
  include the test case logic configured with the intent request information and intent response information in a diagnostics controller of the virtual agent, wherein the diagnostics controller executes the test case logic to test the virtual agent based on the intent request information and the intent response information.

4. The system of claim 1, wherein the instructions for deployment of the virtual agent further cause the processor to:
  receive, from the graphical user interface, an analytics type identifier;
  select analytics engine logic stored in a logic repository, the analytics logic associated with the analytics type identifier;
  generate a real-time analytics engine for the virtual agent, the real-time analytics engine including the selected analytics engine logic, wherein the analytic engine logic causes the real-time analytics engine to monitor one or more variables and display the one or more variables on the graphical user interface.

5. The system of claim 1, wherein the selected cognitive service engine provides natural language generation, wherein the instructions for deployment of the virtual agent further cause the processor to configure the selected cognitive service engine with the generated dialog model by communication of the generated dialog model to the cognitive service engine.

6. The system of claim 1, wherein the dialog model comprises instructions that cause the virtual agent to:
  communicate, to the selected cognitive service engine, natural language input received from a terminal device;
  receive, from the cognitive service engine, an intent classification corresponding to the natural language input; and
  communicate, to the terminal device that sent the natural language input, a response based on the dialog corpus.

7. A method to manage generation and deployment of a virtual agent to a hosted could platform, the method comprising:
  generating a graphical user interface, the graphical user interface comprising a first control, a second control, and a third control, the first control configured to enable selection of a cognitive service engine from a plurality of cognitive service engines, the second control configured to receive a dialog corpus, the third control configured to generate a trigger to deploy the virtual agent;
  obtaining a service identifier of the selected cognitive service engine indicated by the first control;
  obtaining the dialog corpus received by the second control, the dialog corpus comprising a plurality of intent parameters, a plurality of intent response parameters, and a mapping between at least one of the intent parameters and at least one of the intent response parameters, the intent parameters, the intent response parameters, and the mapping being formatted in a first structured format;
  generating the virtual agent for a hosted-cloud platform, the virtual agent including instructions to receive natural language input and to respond the natural language input using the selected cognitive service engine;
  selecting, based on the service identifier, a service builder stored in a database, the database including a plurality of service builders configured to generate respective dialog models, the respective dialog models independently configured for separate cognitive service engines, wherein the selected service builder is associated with a service builder logic, the service builder logic comprising an instruction to combine at least one of the parameters of the dialog corpus with template logic associated with the service builder;
  generating, by execution of the service builder logic associated with the selected service builder, a dialog model based on combination of the template logic with the at least one of the parameters of the dialog corpus, the dialog modal comprising a structured format different from the first structured format, the second structured format configured for the selected cognitive service engine, the dialog model including parameters which cause the selected cognitive service engine to process natural language input according to the intent parameters and the intent response parameters included in the dialog corpus;
  depending on the selected cognitive service engine and the service builder, either
  configuring the selected cognitive service engine with the generated dialog model by communication of the generated dialog model to the cognitive service engine, or
  generating a dialog model service application that uses the generated dialog model to interact with the selected cognitive service engine; and
  deploying, in response to detection of the trigger from the third control, the virtual agent to the hosted-cloud platform.

8. The method of claim 7, further comprising:
  generating a diagnostics controller for the virtual agent, the diagnostics controller configured to test the virtual agent based on a test case, wherein the test case communicates a test message to the virtual agent based on at least one of the intent parameters of the dialog corpus, wherein the test case compares an output message of the virtual agent to an expected result based on at least one of the intent response parameters of the dialog corpus.

9. The method of claim 8, wherein generating the diagnostics controller for the virtual agent further comprises:
  accessing test case logic stored in a repository, the test case logic comprising an input field and a result field;

replacing the input field with intent request information corresponding to at least one of the intent parameters of the dialog corpus;

replacing the result field with intent response information corresponding to t at least one of the intent response parameters of the dialog corpus; and including the test case logic configured with the intent request information and intent response information in a dialog controller of the virtual agent, wherein the dialog controller executes the test case logic to test the virtual agent.

10. The method of claim 7, further comprising:

receiving a cognitive service update request comprising a second service identifier corresponding to a second cognitive service engine;

selecting, based on the second service identifier, a second service builder corresponding to the second cognitive service engine;

generating, by execution of service builder logic associated with the second service builder, a second dialog model configured for the second cognitive service engine; and reconfiguring the dialog model service application to interact with the second cognitive service engine based on the second dialog mode.

11. The method of claim 7, wherein the selected cognitive service engine is configured to provide natural language generation, wherein the method further comprises:

configuring the selected cognitive service engine with the generated dialog model by communication of the generated dialog model to the cognitive service engine.

12. The method of claim 7, wherein the dialog model comprises instructions that cause the virtual agent to:

communicate, to the selected cognitive service engine, natural language input received from a terminal device;

receive, from the cognitive service engine, an intent classification corresponding to the natural language input; and communicate, to the terminal device that sent the natural language input, a response based on the dialog corpus.

13. Circuitry for rapidly deployment of a virtual agent to a hosted could platform, the circuitry comprising:

circuitry configured to generate a graphical user interface, the graphical user interface comprising a first control, a second control, and a third control, the first control configured to enable selection of a cognitive service engine from a plurality of cognitive service engines, the second control configured to receive a dialog corpus, the third control configured to generate a trigger to deploy the virtual agent;

circuitry configured to obtain a service identifier of the selected cognitive service engine indicated by the first control;

circuitry configured to obtain the dialog corpus from the second control, the dialog corpus comprising a plurality of intent parameters, a plurality of intent response parameters, and a mapping between at least one of the intent parameters and at least one of the intent response parameters, the intent parameters, the intent response parameters, and the mapping being formatted in a first structured format;

circuitry configured to generate the virtual agent for a hosted-cloud platform, the virtual agent including instructions to receive natural language input and to respond the natural language input using the selected cognitive service engine;

circuitry configured to select, based on the service identifier, a service builder stored in a database, the database including a plurality of service builders configured to generate respective dialog models, the respective dialog models independently configured for separate cognitive service engines, wherein the selected service builder is associated with service builder logic, the service builder logic comprising an instruction to combine at least one of the parameters of the dialog corpus with template logic associated with the service builder;

circuitry configured to generate, by execution of the service builder logic associated with the selected service builder, a dialog model based on combination of the template logic with the at least one of the parameters of the dialog corpus, the dialog modal comprising a structured format different from the first structured format, the second structured format configured for the selected cognitive service engine, the dialog model including parameters which cause the selected cognitive service engine to process natural language input according to the intent parameters and the intent response parameters included in the dialog corpus;

circuitry configured to depending on the selected cognitive service engine and the service builder, either configure the selected cognitive service engine with the generated dialog model by communication of the generated dialog model to the cognitive service engine, or generate a dialog model service application that uses the generated dialog model to interact with the selected cognitive service engine; and circuitry configured to deploy, in response to detection of the trigger from the third control, the virtual agent to the hosted-cloud platform.

14. The circuitry of claim 13, further comprising:

circuitry configured to generate a diagnostics controller for the virtual agent, the diagnostics controller configured to test the virtual agent based on a test case, wherein the test case communicates a test message to the virtual agent based on at least one of the intent parameters of the dialog corpus, wherein the test case compares an output message of the virtual agent to an expected result based on at least one of the intent response parameters of the dialog corpus.

15. The circuitry of claim 14, wherein the circuitry configured to generate the diagnostics controller for the virtual agent further comprises:

circuitry configured to access test case logic stored in a repository, the test case logic comprising a an input field and a result field;

circuitry configured to replace the input field with intent request information corresponding to at least one of the intent parameters of the dialog corpus;

circuitry configured to replace the result field with intent response information corresponding to t at least one of the intent response parameters of the dialog corpus; and circuitry configured to include the test case logic configured with the intent request information and intent response information in a dialog controller of the virtual agent, wherein the dialog controller executes the test case logic to test the virtual agent.

16. The circuitry of claim 13, further comprising:

circuitry configured to communicate the generated dialog model to the cognitive service engine.

17. The circuitry of claim 13, wherein the dialog model comprises instructions that cause the virtual agent to:

communicate, to the selected cognitive service engine, natural language input received from a terminal device;

receive, from the cognitive service engine, an intent classification corresponding to the natural language input; and communicate, to the terminal device that sent the natural language input, a response based on the dialog corpus.

\* \* \* \* \*